US008537414B2

(12) United States Patent
Takatsuka

(10) Patent No.: US 8,537,414 B2
(45) Date of Patent: Sep. 17, 2013

(54) IMAGE FORMING APPARATUS AND METHOD OF ADJUSTING COLOR BALANCE

(75) Inventor: Ryo Takatsuka, Tokyo (JP)

(73) Assignee: Oki Data Corporation, Tokyo (JP)

( * ) Notice: Subject to any disclaimer, the term of this patent is extended or adjusted under 35 U.S.C. 154(b) by 571 days.

(21) Appl. No.: 12/826,866

(22) Filed: Jun. 30, 2010

(65) Prior Publication Data

US 2011/0001990 A1 Jan. 6, 2011

(30) Foreign Application Priority Data

Jul. 1, 2009 (JP) ................................ 2009-156514

(51) Int. Cl.
*G06F 15/00* (2006.01)
*G06K 1/00* (2006.01)

(52) U.S. Cl.
USPC ............................................ 358/1.2; 358/1.9

(58) Field of Classification Search
USPC .................... 358/1.1, 1.2, 1.9, 500, 504, 518, 358/520; 382/162, 167; 347/236; 399/49
See application file for complete search history.

(56) References Cited

U.S. PATENT DOCUMENTS

| | | | | |
|---|---|---|---|---|
| 7,200,346 | B2 | 4/2007 | Chigira | |
| 2007/0097462 | A1 * | 5/2007 | Goma et al. | 358/504 |
| 2008/0111879 | A1 * | 5/2008 | Arai et al. | 347/238 |

FOREIGN PATENT DOCUMENTS

| | | | |
|---|---|---|---|
| EP | 1460481 | | 9/2004 |
| JP | 06-194918 | A | 7/1994 |
| JP | 2004-258281 | | 9/2004 |
| JP | 2004-258281 | A | 9/2004 |
| JP | 2005-010580 | A | 1/2005 |

* cited by examiner

*Primary Examiner* — Gabriel Garcia
(74) *Attorney, Agent, or Firm* — Kubotera & Associates LLC

(57) ABSTRACT

An image forming apparatus is capable of adjusting a print density with a plurality of set values including a first set value and a second set value. The image forming apparatus includes a storage unit for storing a first density as a target value of the print density; a density detection unit for detecting a second density as a print density of an image printed on a transfer medium; and a control unit for adjusting the print density. The control unit compares the first density and the second density, and calculates a first correction value applied to one of the first set value and the second set value for correcting the second density to the first density according to a density difference generation condition determined in advance. The control unit corrects the first set value or the second set value according to the first correction value for adjusting color balance.

20 Claims, 12 Drawing Sheets

IMAGE FORMING APPARATUS AND METHOD OF ADJUSTING COLOR BALANCE

BACKGROUND OF THE INVENTION AND RELATED ART STATEMENT

The present invention relates to an image forming apparatus capable of forming an image in colors. Further, the present invention relates to a method of adjusting color balance applied to the image forming apparatus.

In a conventional image forming apparatus, a toner image as a developer image is formed on a photosensitive drum, and the toner image is transferred to a printing medium or a transfer medium such as a transportation belt. Such a conventional image forming apparatus includes a printer of an electro-photography type, a facsimile, a copier, or a multi function product having three functions of the facsimile, the copier, and the printer.

The conventional image forming apparatus may have a capability of forming an image in colors. In the conventional image forming apparatus, it is necessary to accurately adjust color balance for obtaining a color image with high quality.

In the conventional image forming apparatus, in order to accurately adjust color balance, it may be configured to control an energy amount of a static latent image forming unit and an energy amount of a developing unit (refer to Patent Reference).

Patent Reference: Japanese Patent Publication No. 2004-258281

In this case, the energy amount of the static latent image forming unit represents an energy amount of light irradiated on a photosensitive drum. More specifically, the energy amount is represented with an exposure time during which a light irradiation unit such as an LED (Light Emitting Diode) and a laser light source exposes the photosensitive drum, or an amount of drive power applied to the light irradiation unit. In the following description, the energy amount of the static latent image forming unit is referred to as an exposure light energy.

Further, the energy amount of the developing unit represents an energy amount defined with one of a developing voltage, a supply voltage, and a charging voltage. In the following description, the energy amount of the developing unit is referred to as a developing energy.

In the conventional image forming apparatus described above, when color balance is adjusted, first, different density detection patterns are printed or transferred to a surface of the photosensitive drum or a transfer medium. In the next step, a density detection unit formed of a density sensor and the like detects densities of the density detection patterns thus printed, so that one of the exposure light energy and the developing energy is controlled according to density values thus detected.

In this case, a correction value of a light amount is added to a printing condition, thereby controlling the exposure light energy. Alternatively, a correction value of a developing voltage is added to a printing condition, thereby controlling the developing energy.

In the next step, in the conventional image forming apparatus, the density detection patterns are printed on the surface of the transfer medium one more time. Then, the density detection unit detects densities of the density detection patterns thus printed, so that the other of the exposure light energy and the developing energy is controlled according to density values thus detected. Through the process described above, in the conventional image forming apparatus, it is possible to obtain proper color balance.

As described above, in the conventional image forming apparatus, when color balance is adjusted, first, one of the exposure light energy and the developing energy is controlled according to the density values. After one of the exposure light energy and the developing energy is controlled, the density detection unit detects the densities of the density detection patterns, so that the other of the exposure light energy and the developing energy is controlled according to the density values.

In this case, in the conventional image forming apparatus, depending on which one of the exposure light energy and the developing energy is controlled first, a final energy correction amount may be different. When one of the exposure light energy and the developing energy is controlled first, the other of the exposure light energy and the developing energy may be controlled by an amount different from the case in the reversed order.

As described above, in the conventional image forming apparatus, when one of the exposure light energy and the developing energy is controlled in a fixed order for adjusting color balance, color balance may be over adjusted. In other words, the light amount or the developing voltage may be adjusted by an excessive correction value. As a result, the conventional image forming apparatus may cause a print quality problem, thereby deteriorating printed image quality.

In view of the problems described above, an object of the present invention is to provide an image forming apparatus capable of solving the problems of the conventional image forming apparatus. In the present invention, it is possible to prevent color balance from being overly adjusted, thereby preventing image quality from deteriorating. Further, an object of the present invention is to provide a method of adjusting color balance applied to the image forming apparatus.

Further objects and advantages of the invention will be apparent from the following description of the invention.

SUMMARY OF THE INVENTION

In order to attain the objects described above, according to a first aspect of the present invention, an image forming apparatus is configured to adjust a print density with a plurality of set values including a first set value and a second set value. The image forming apparatus includes a storage unit for storing a first density as a target value of the print density; a density detection unit for detecting a second density as a print density of an image printed on a transfer medium; and a control unit for adjusting the print density.

In the first aspect of the present invention, the control unit is arranged to compare the first density stored in the storage unit and the second density detected with the density detection unit. Further, the control unit is arranged to calculate a first correction value as a correction value applied to one of the first set value and the second set value for correcting the second density to the first density according to a density difference generation condition determined in advance. Further, the control unit is arranged to correct one of the first set value and the second set value according to the first correction value, thereby adjusting color balance.

According to a second aspect of the present invention, a method of adjusting color balance applied to an image forming apparatus. The image forming apparatus includes a storage unit for storing a first density as a target value of a print density; a density detection unit for detecting a second density as a print density of an image printed on a transfer medium; and a control unit for adjusting the print density. The image forming apparatus is configured to adjust the print density with a plurality of set values including a first set value and a second set value.

In the second aspect of the present invention, the control unit is arranged to compare the first density stored in the storage unit and the second density detected with the density detection unit. Further, the control unit is arranged to calculate a first correction value as a correction value applied to one of the first set value and the second set value for correcting the second density to the first density according to a density difference generation condition determined in advance. Further, the control unit is arranged to correct one of the first set value and the second set value according to the first correction value, thereby adjusting color balance.

In the first aspect of the present invention, it is possible to provide the image forming apparatus capable of preventing printed image quality from deteriorating due to unnecessary over correction. In the second aspect of the present invention, it is possible to provide the method of adjusting color balance applicable to the image forming apparatus in the first aspect.

DETAILED DESCRIPTION OF PREFERRED EMBODIMENTS

Figure 1:
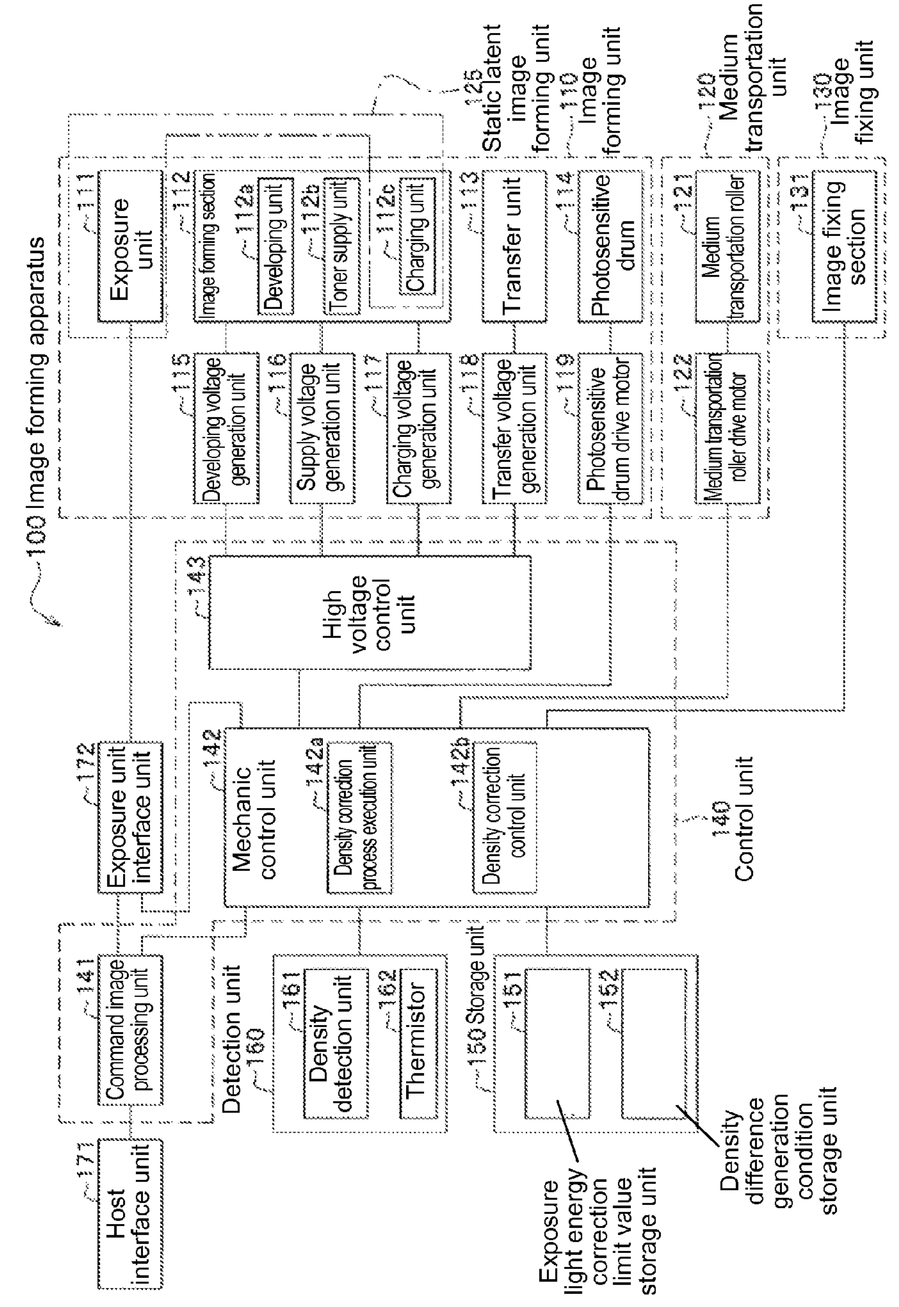
FIG. 1 is a block diagram showing a configuration of an image forming apparatus according to a first embodiment of the present invention.

Hereunder, embodiments of the present invention will be explained with reference to the accompanying drawings. The accompanying drawings are shown for explanation purpose only, and the present invention is not limited to the accompanying drawings. In the accompanying drawings, same components or similar components are designated with the same reference numerals, and explanations thereof are omitted.

First Embodiment

Figure 2:
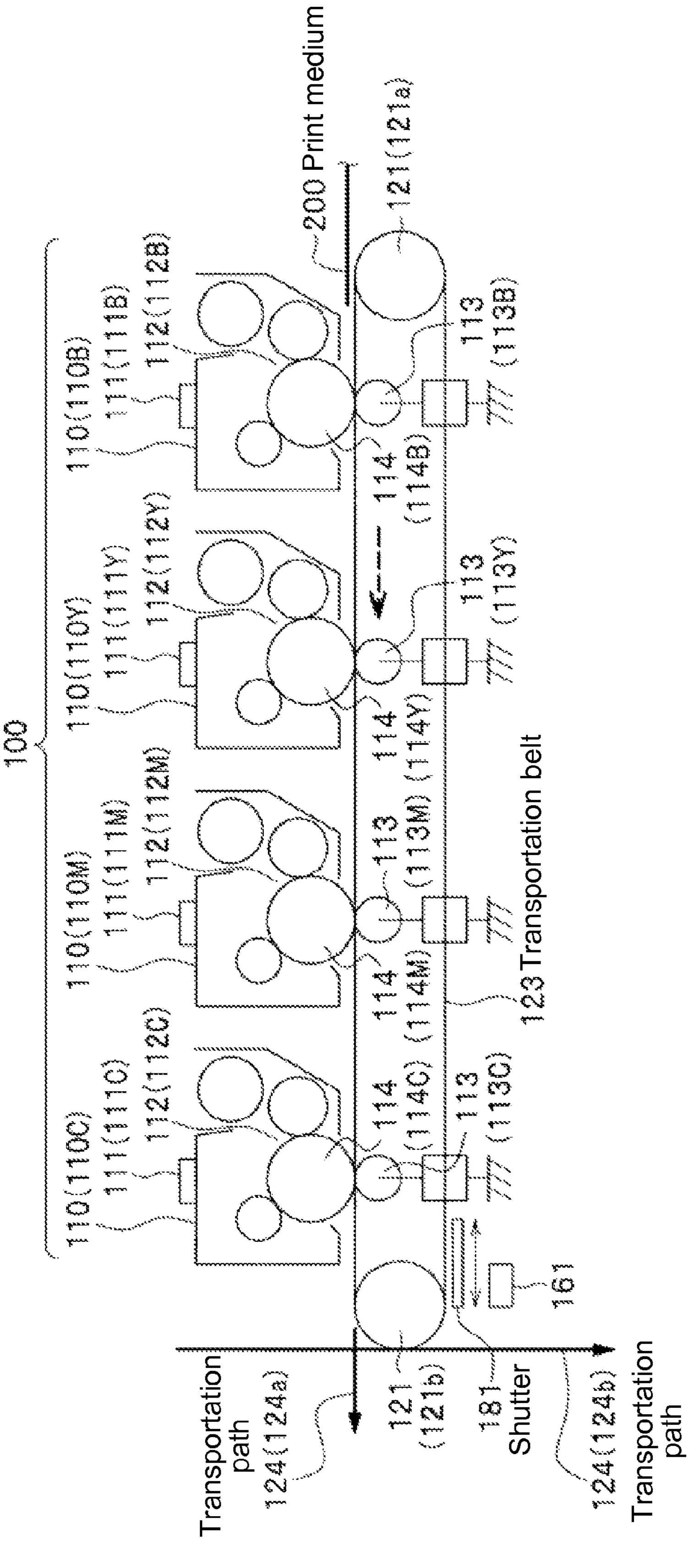
FIG. 2 is a schematic side view showing components of the image forming apparatus according to the first embodiment of the present invention.

A configuration of an image forming apparatus 100 according to a first embodiment of the present invention will be explained with reference to FIGS. 1 and 2. FIG. 1 is a block diagram showing the configuration of the image forming apparatus 100 according to the first embodiment of the present invention. FIG. 2 is a schematic side view showing components of the image forming apparatus 100 according to the first embodiment of the present invention.

In the embodiment, the image forming apparatus 100 is a printer of an electro-photography type, a facsimile, a copier, or a multi function product having three functions of the facsimile, the copier, and the printer. Alternatively, the image forming apparatus 100 may be an image forming apparatus of any type. In the following description, the image forming apparatus 100 is a printer of a color electro-photography type.

As shown in FIG. 1, the image forming apparatus 100 includes an image forming unit 110, a medium transportation unit 120, an image fixing unit 130, a control unit 140, a storage unit 150, and a detection unit 160.

In the embodiment, the image forming unit 110 is provided for forming an image on a print medium 200 (refer to FIG. 2) or a transportation belt 123 (refer to FIG. 2). The image forming unit 110 includes an exposure unit 111, an image forming section 112, a transfer unit 113, a photosensitive drum 114, a developing voltage generation unit 115, a supply voltage generation unit 116, a charging voltage generation unit 117, a transfer voltage generation unit 118, and a photosensitive drum drive motor 119.

In the embodiment, the exposure unit 111 is provided for forming a static latent image on the photosensitive drum 114 charged with a charging unit 112*c*. The exposure unit 111 is formed of an LED (Light Emitting Diode) head. Further, the exposure unit 111 and the charging unit 112*c* constitute a static latent image forming unit 125 for forming a static latent image on the photosensitive drum 114.

In the embodiment, the image forming section 112 is provided for forming a visualized image on the photosensitive drum 114. The image forming section 112 includes a developing unit 112*a*, a toner supply unit 112*b*, and the charging unit 112*c*.

In the embodiment, the developing unit 112*a* is provided for attaching developer (toner) to the static latent image formed on the photosensitive drum 114, so that the static latent image is visualized. In other words, the developing unit 112*a* is provided for forming a developer image (a toner image). More specifically, the developing voltage generation unit 115 applies a developing voltage (corresponding to a developing energy) to the developing unit 112*a*, so that the developing unit 112*a* attaches developer (toner) to the static latent image formed on the photosensitive drum 114.

In the embodiment, the toner supply unit 112*b* is provided for supplying developer to the developing unit 112*a*. The toner supply unit 112*b* retains developer in a corresponding color (one of black (B), yellow (Y), magenta (M), and cyan (C)). More specifically, the supply voltage generation unit 116 applies a supply voltage to the toner supply unit 112*b*, so that the toner supply unit 112*b* applies electric charges to developer and supplies developer to the developing unit 112*a*.

In the embodiment, the charging unit 112*c* is provided for charging the photosensitive drum 114. More specifically, the charging voltage generation unit 117 applies a charging voltage to the charging unit 112*c*, so that the charging unit 112*c* charges the photosensitive drum 114.

In the embodiment, the image forming unit 110 is disposed at four locations corresponding to each color of black (B), yellow (Y), magenta (M), and cyan (C). In the following description, when it is necessary to differentiate a component corresponding to each color, the component is designated with a reference numeral with one of letters B, Y, M, and C representing the color.

In the embodiment, the transfer unit 113 is provided for transferring the developer image (the toner image) formed on the photosensitive drum 114 to a transfer medium. As shown in FIG. 2, the transfer unit 113 is formed of a transportation roller disposed on a backside surface of the transportation belt 123 at a position facing the photosensitive drum 114. In other words, the transfer unit 113 and the photosensitive drum 114 are arranged to sandwich the transportation belt 123 and the print medium 200 such as a sheet. The transfer voltage generation unit 118 applies a transfer voltage to the transfer unit 113, so that the transfer unit 113 transfers the developer image (the toner image) formed on the photosensitive drum 114 to the transfer medium. The transfer medium, to which the developer image (the toner image) formed on the photosensitive drum 114 is transferred, includes the transportation belt 123 and the print medium 200.

In the embodiment, the photosensitive drum 114 is an image supporting member for forming the static latent image and the developer image (the toner image) thereon. The developing voltage generation unit 115 is provided for generating the developing voltage (the developing energy) to be applied to the developing unit 112*a* of the image forming section 112. The supply voltage generation unit 116 is provided for generating the supply voltage to be applied to the toner supply unit 112*b* of the image forming section 112. The charging voltage generation unit 117 is provided for generating the charging voltage to be applied to the charging unit 112*c*. The transfer voltage generation unit 118 is provided for generating the transfer voltage to be applied to the transfer unit 113. The photosensitive drum drive motor 119 is provided for driving the photosensitive drum 114 to rotate.

In the embodiment, the medium transportation unit 120 is provided for transporting the transfer medium (that is, the transportation belt 123 and the print medium 200). The medium transportation unit 120 includes medium transportation rollers 121 and a medium transportation roller drive motor 122. The medium transportation rollers 121 are provided for extending the transportation belt 123, and are formed of a pair of rollers 121*a* and 121*b* (refer to FIG. 2). The medium transportation roller drive motor 122 is provided for driving one or both of the rollers 121*a* and 121*b* to rotate, so that the transportation belt 123 moves in a direction represented with a hidden line in FIG. 2 to transport the print medium 200.

In the embodiment, the image fixing unit 130 is provided for fixing the image transferred to the print medium 200. The image fixing unit 130 is formed of a roller. The image fixing unit 130 includes a heater as an image fixing section 131. While the image fixing unit 130 is rotating, the image fixing section 131 heats the print medium 200, so that the image transferred to the print medium 200 is fixed.

In the embodiment, the control unit 140 is provided for controlling each component of the image forming apparatus 100. The control unit 140 is formed of a CPU (Central Processing Unit). The control unit 140 includes a command image processing unit 141, a mechanic control unit 142, and a high voltage control unit 143.

In the embodiment, the command image processing unit 141 is provided for processing a command of print data and image data. The command image processing unit 141 is connected to a host device (a computer, not shown) through a host interface unit 171, so that the command image processing unit 141 receives the print data transmitted from the host device. Further, the command image processing unit 141 is connected to the exposure unit 111 through an exposure unit interface unit 172, so that the command image processing unit 141 controls the exposure unit 111.

In the embodiment, the mechanic control unit 142 is provided for controlling various mechanical components such as the exposure unit 111, the high voltage control unit 143, the photosensitive drum drive motor 119, the medium transportation roller drive motor 122, and the image fixing unit 130. The mechanic control unit 142 is connected to the storage unit 150, so that the mechanic control unit 142 stores setting data, data transmitted from the host device, and data detected with the detection unit 160 in the storage unit 150. The mechanic control unit 142 includes a density correction process execution unit 142*a* and a density correction control unit 142*b*.

In the embodiment, the density correction process execution unit 142*a* is provided for executing a density correction process according to a print density of an image detected with a density detection unit 161 formed of a density sensor using an optical sensor (described later). More specifically, the density correction process execution unit 142*a* is provided for determining an order of correcting the exposure light energy of the exposure unit 111 and the developing energy of the developing unit 112*a*, and for calculating a correction value of the exposure light energy of the exposure unit 111 and the developing energy of the developing unit 112*a*. The density correction control unit 142*b* is provided for controlling the density correction process according to a determination result of the density correction process execution unit 142*a*.

In the embodiment, the high voltage control unit 143 is provided for controlling the developing voltage generation unit 115, the supply voltage generation unit 116, the charging voltage generation unit 117, and the transfer voltage generation unit 118. When the high voltage control unit 143 receives an instruction from the mechanic control unit 142, the high voltage control unit 143 controls the developing voltage generation unit 115, the supply voltage generation unit 116, the charging voltage generation unit 117, and the transfer voltage generation unit 118 to apply a high voltage to the corresponding components, respectively.

In the embodiment, the storage unit 150 is provided for storing various programs and data. The storage unit 150 is formed of an RAM (Random Access Memory), an ROM (Read Only Memory), an HDD (Hard Disk Drive), and the likes. Further, the storage unit 150 stores a plurality of setting values such as a setting value of the exposure light energy as a first setting value and a setting value of the developing energy as a second setting value.

Further, the storage unit 150 stores data received from the host device and detected data. The storage unit 150 includes an exposure light energy correction limit value storage unit 151 and a density difference generation condition storage unit 152. Further, the storage unit 150 stores in advance a target density 405 (described later) as a target value of a density for adjusting color balance.

In the embodiment, the exposure light energy correction limit value storage unit 151 is provided for storing an exposure light energy correction limit value in advance. The exposure light energy correction limit value defines a limit of a correction value of the exposure light energy. In the following description, the exposure light energy correction limit value is referred to as a limit value or a specific value.

In the embodiment, in general, the limit value is set to a value of, for example, 15% when the image forming apparatus 100 is delivered. In this case, when the density correction process execution unit 142*a* controls the exposure light energy, the density correction process execution unit 142*a* refers to the limit value stored in advance in the exposure light energy correction limit value storage unit 151. Then, the density correction process execution unit 142*a* calculates the correction value of the exposure light energy such that the correction value of the exposure light energy has a value within 15% from the target density 405 (refer to FIG. 6).

In the embodiment, the density difference generation condition storage unit 152 is provided for storing in advance a density difference generation condition, which is referred to when the order of controlling (correcting) the exposure light energy and the developing energy. The density difference generation condition is determined in advance according to a range of a print density of a density detection pattern printed on the transportation belt 123. According to the print density, the density difference generation condition defines the order of controlling (correcting) the exposure light energy and the developing energy and a method of calculating the correction value of the exposure light energy and the correction value of the developing energy.

In the embodiment, the detection unit 160 is provided for detecting a density of an image, a temperature, and the like. The detection unit 160 includes the density detection unit 161 using an optical sensor, a thermistor 162 as a temperature sensor, and a sensor for detecting a medium. The density detection unit 161 is configured to irradiate light on an image, so that the density detection unit 161 detects an amount of reflected light to detect the density of the image. The density detection unit 161 is formed of a light emitting portion and a light receiving portion, and detects a density of color toner and black toner. The thermistor 162 is provided for measuring an environmental temperature.

An arrangement of the components described above will be explained next. As shown in FIG. 2, the image forming apparatus 100 is provided with a pair of the medium transportation rollers 121*a* and 121*b*, and the transportation belt 123 is extended between the medium transportation rollers 121*a* and 121*b*. When the medium transportation roller drive motor 122 (refer to FIG. 1) drives one or both of the medium transportation rollers 121*a* and 121*b* to rotate, the transportation belt 123 moves.

In the embodiment, around the transportation belt 123, the image forming units 110B, 110Y, 110M, and 110C corresponding to each color of black (B), yellow (Y), magenta (M), and cyan (C) are sequentially disposed from an upstream side along the transportation belt 123. Each of the image forming units 110B, 110Y, 110M, and 110C is provided with the photosensitive drum 114, the static latent image forming unit 125 including the charging unit 112*c* and the exposure unit 111 (refer to FIG. 1), the developing unit 112*a* (refer to FIG. 1), and the transfer unit 113.

In the embodiment, when the exposure unit 111 is formed of the LEDs, a few thousands of the LEDs are arranged in a direction perpendicular to a transportation direction of the print medium 200. All of the LEDs are configured to emit light according to a drive signal transmitted from the control unit 140 through the exposure unit interface unit 172 (refer to FIG. 1). Note that the mechanic control unit 142 is configured to adjust an exposure time of the exposure unit 111, so that the control unit 140 controls the exposure light energy, that is, energy of exposing the photosensitive drum 114.

In the embodiment, the image forming apparatus 100 is provided with one or both of a transportation path 124*a* and a transportation path 124*b* as a transportation path 124 for transporting the print medium 200. The transportation path 124*a* is provided for transporting the print medium 200 from a side of the medium transportation roller 121*a* toward the medium transportation roller 121*b* along the surface of the transportation belt 123. Accordingly, the transportation path 124*a* transports the print medium 200, so that the image formed on the photosensitive drum 114 is directly transferred to the print medium 200.

In contrast, the transportation path 124*b* is arranged along a tangential direction relative to a surface of the medium transportation roller 121*b*. More specifically, as shown in FIG. 2, the transportation path 124*b* is arranged along a direction perpendicular to the transportation path 124*a*. The transportation path 124*a* is provided for transporting the print medium 200, so that the image formed on the photosensitive drum 114 is temporarily transferred to the transportation belt 123, and the image transferred to the transportation belt 123 is transferred to the print medium 200 through a secondary transfer process.

In the embodiment, when the image forming apparatus 100 is provided with the transportation path 124*b*, the transfer units 113 are disposed around the transportation path 124*b* for performing the secondary transfer process. Further, when the image forming apparatus 100 is provided with the transportation path 124*b*, and the image forming apparatus 100 forms images in multiple colors, the images in the multiple colors are transferred to and overlapped on the transportation belt 123, and the images are transferred to the print medium 200 through the secondary transfer process. Note that the mechanic control unit 142 of the control unit 140 (refer to FIG. 1) controls timing of transferring the images.

In the embodiment, after the image formed with a part or all of the image forming units 110B, 110Y, 110M, and 110C is transferred to the print medium 200, the print medium 200 is separated from the transportation belt 123, and the image fixing unit 130 (refer to FIG. 1) heats the print medium 200, thereby fixing the image to the print medium 200. Afterward, the print medium 200 is discharged outside the image forming apparatus 100.

In the embodiment, the density detection unit 161 is arranged below the transportation belt 123 at a position near the medium transportation roller 121*b*. The density detection unit 161 is provided for detecting a density of an image formed on the transportation belt 123 as the density detection pattern (referred to as the density detection pattern).

In the embodiment, a shutter 181 is arranged above the density detection unit 161 at a position between the density detection unit 161 and the transportation belt 123. The shutter 181 is provided for preventing a stain such as toner from being adhered to the density detection unit 161. A shutter drive unit (not shown) formed of a solenoid or a motor is provided for driving the shutter 181. When color balance is adjusted (more specifically, the density detection unit 161 detects the density), the shutter 181 is opened. In other occasions, the shutter 181 is closed, so that the shutter 181 blocks between the density detection unit 161 and the transportation belt 123. Accordingly, the shutter 181 prevents a stain such as toner from being adhered to the density detection unit 161.

Figure 3:
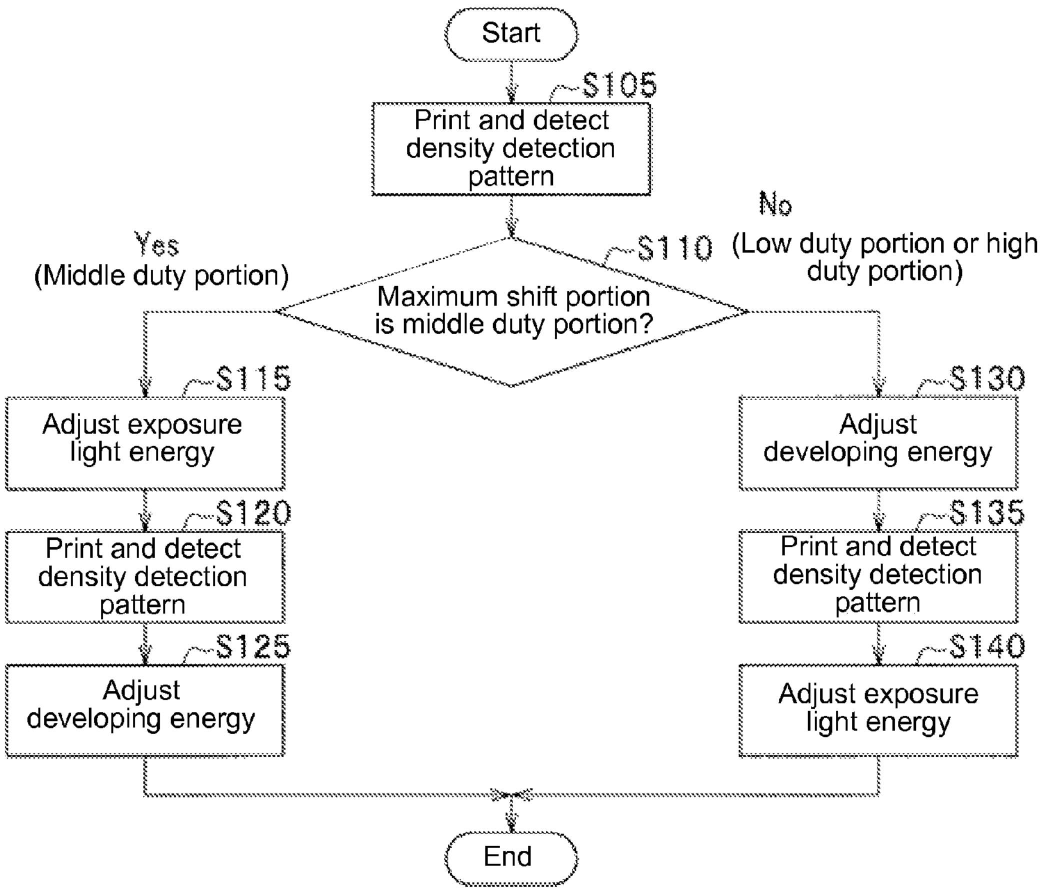
FIG. 3 is a flow chart showing a method of adjusting color balance applied to the image forming apparatus according to the first embodiment of the present invention.
Figure 4A:
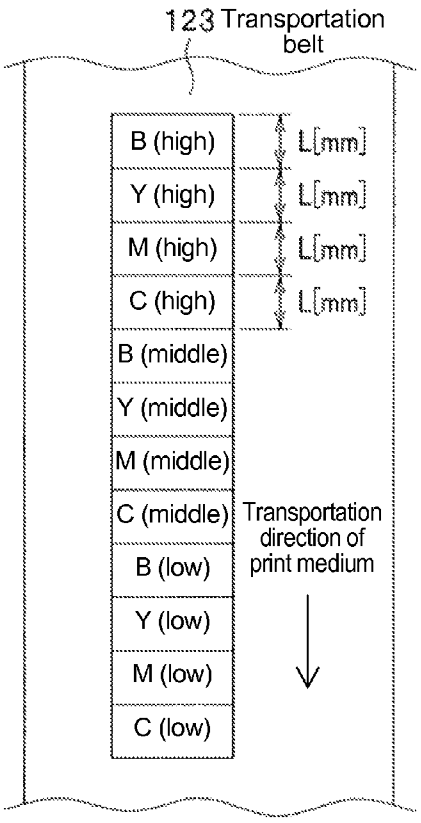
FIGS. 4(*a*) and 4(*b*) are schematic views showing density detection patterns of the image forming apparatus according to the first embodiment of the present invention.
Figure 4B:
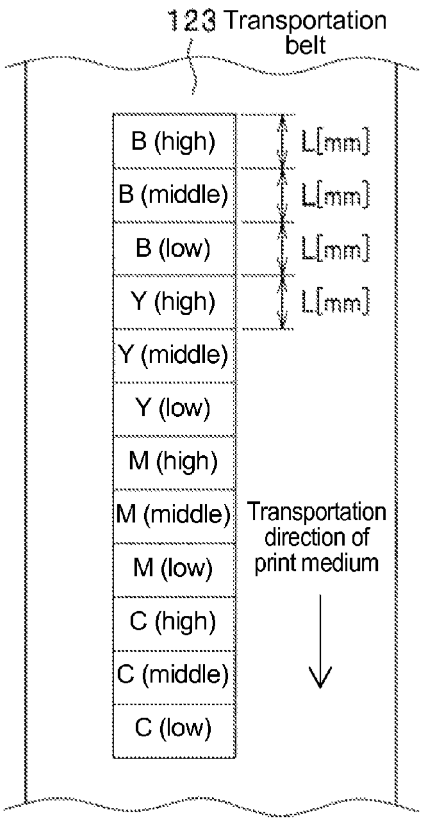

An operation of the image forming apparatus 100 for adjusting color balance will be explained next with reference to FIGS. 3 and 4. FIG. 3 is a flow chart showing a method of adjusting color balance applied to the image forming apparatus 100 according to the first embodiment of the present invention. FIGS. 4(*a*) and 4(*b*) are schematic views showing the density detection patterns of the image forming apparatus 100 according to the first embodiment of the present invention.

As shown in FIG. 3, in step S105, when the image forming apparatus 100 adjusts color balance, the image forming apparatus 100 prints and detects the density detection pattern. An operation of the image forming apparatus 100 in step S105 is as follows.

In a state that the shutter 181 is closed, the image forming apparatus 100 drives the medium transportation unit 120 to move only the transportation belt 123 without transporting the print medium 200, and the image forming units 110B, 110Y, 110M, and 110C are driven. At this moment, the image forming apparatus 100 adjusts the exposure light energy of the exposure unit 111B, 111Y, 111M, and 111C of the image forming units 110B, 110Y, 110M, and 110C, respectively. Accordingly, the image forming apparatus 100 sequentially forms the density detection patterns in each color of black (B), yellow (Y), magenta (M), and cyan (C) on the photosensitive drums 114. Every time the image forming apparatus 100 forms the density detection pattern in each color, the transfer unit 113 transfers (prints) the density detection pattern on the transportation belt 123.

In the embodiment, each of the density detection patterns includes a low duty density detection pattern, a middle duty density detection pattern, and a high duty density detection pattern in each color. A duty represents a toner developing area ratio, that is, a ratio of toner transferred to the transportation belt 123 relative to a specific area. A low duty density represents a range where a print duty is smaller than 50%; a middle duty density represents a range where the print duty is between 30% and 80%; and a high duty density represents a range where the print duty is greater than 60%.

Further, the print duty of the low duty density is always smaller than that of the middle duty density, and the print duty of the middle duty density is always smaller than that of the high duty density. In the following description, the low duty density detection pattern, the middle duty density detection pattern, and the high duty density detection pattern are referred to as a low duty portion, a middle duty portion, and a high duty density portion, respectively.

FIGS. 4(*a*) and 4(*b*) are schematic views showing examples of the density detection patterns transferred (printed) on the transportation belt 123 according to the first embodiment of the present invention.

As shown in FIG. 4(*a*), the density detection pattern includes the low density portions in cyan, magenta, yellow, and black; the middle density portions in cyan, magenta, yellow, and black; and the high density portions in cyan, magenta, yellow, and black, in this order.

As shown in FIG. 4(*b*), the density detection pattern includes the low density portion, the middle density portion, and the high density portion in cyan; the low density portion, the middle density portion, and the high density portion in magenta; the low density portion, the middle density portion, and the high density portion in yellow; and the low density portion, the middle density portion, and the high density portion in black, in this order.

In the embodiment, the density detection pattern includes the low density portions, the middle density portions, and the high density portions in the orders shown in FIGS. 4(*a*) and 4(B). Alternatively, the density detection pattern includes the low density portions, the middle density portions, and the high density portions in a different order. For example, the density detection pattern may include the middle density portion in yellow at first, or the high density portion in black at first.

Further, in the embodiment, the image forming apparatus 100 uses toner in the four colors, i.e., black (B), yellow (Y), magenta (M), and cyan (C). Alternatively, the image forming apparatus 100 may use toner in five colors or less than four colors. It is preferred that each of the low duty density detection pattern, the middle duty density detection pattern, and the high duty density detection pattern has a specific density pattern length L (mm) as shown in FIGS. 4(*a*) and 4(*b*).

After the image forming apparatus 100 transfers (prints) the density detection patterns to the transportation belt 123, the image forming apparatus 100 opens the shutter 181, so that the density detection unit 161 detects densities of the density detection patterns. More specifically, when the transportation belt 123 moves, the density detection patterns transferred to the transportation belt 123 pass above the density detection unit 161. Each time when each of the density detection patterns passes through the density detection unit 161, the density detection unit 161 detects the density of each of the density detection patterns at an arbitrary timing. Afterwards, the density detection unit 161 transmits the density values of the density detection patterns thus detected to the mechanic control unit 142.

In the next step, when the mechanic control unit 142 receives the density values of the density detection patterns from the density detection unit 161, the mechanic control unit 142 sequentially stores the density values of the density detection patterns in the storage unit 150 (refer to FIG. 1). After the density values of the density detection patterns in all colors are detected, the image forming apparatus 100 closes the shutter 181. Accordingly, the image forming apparatus 100 completes the operation of printing and detecting the density detection patterns.

When a conventional image forming apparatus includes an exposure unit formed of an LED light source, a few thousands of LEDs are arranged in a direction perpendicular to a moving direction of a transportation belt. When the exposure unit is formed of the LED light source, it is not necessary to dispose a mechanical reflection mirror unit, thereby reducing a size and power consumption of the conventional image forming apparatus.

However, in the conventional image forming apparatus using the LED light source, when the LED light source is produced, the LEDs may have variance in an emitting light intensity thereof. When the LEDs have variance in the emitting light intensity, a toner density may have a variance along a transportation direction of a print medium when the print medium is transported during a printing operation. As a result, a lateral streak may be generated in the image printed on the print medium along the transportation direction of the print medium.

In the conventional image forming apparatus using the LED light source, in order to prevent such a phenomenon (the generation of the lateral streak), it may be configured to adjust an input current of each of the LEDs, so that the emitting light intensities of the LEDs become uniform. Alternatively, it may be configured to adjust an exposure time of the LEDs for correcting an exposure light energy thereof, or to adjust a developing voltage, a supply voltage, and a charging voltage for correcting a developing energy.

However, in the conventional image forming apparatus using the LED light source, when the exposure times of all of the LEDs are uniformly adjusted, a correction balance may be out of a proper balance. Further, in the conventional image forming apparatus using the LED light source, when the developing energy is excessively changed, developer (toner) may be overly charged during the printing operation, or developer may be charged with a polarity opposite to a normal polarity. As a result, in the conventional image forming apparatus using the LED light source, a print quality problem such as a smeared image may occur, thereby deteriorating printed image quality.

Figure 5:
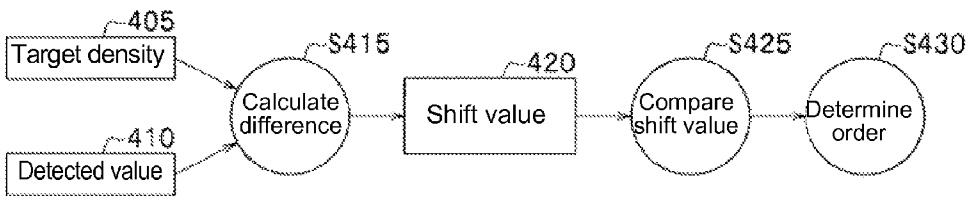
FIG. 5 is a schematic view showing a data flow of the method of adjusting color balance applied to the image forming apparatus according to the first embodiment of the present invention.

In the embodiment, in order to prevent such a risk, after step S105, the density correction process execution unit 142*a* of the mechanic control unit 142 processes data as shown in FIG. 5, so that the density correction process execution unit 142*a* executes the density correction process. More specifically, the density correction process execution unit 142*a* is configured to determine the order of correcting the exposure energy of the exposure unit 111 and the developing energy of the developing unit 112*a*, and to calculate the correction values of the exposure light energy of the exposure unit 111 and the developing energy of the developing unit 112*a*.

FIG. 5 is a schematic view showing a data flow of the method of adjusting color balance applied to the image forming apparatus 100 according to the first embodiment of the present invention.

In step S415, the density correction process execution unit 142*a* compares a target value of the print density or a target density 405 (refer to FIG. 5) stored in advance in the storage unit 150 for adjusting color balance with a detected value 410 (refer to FIG. 5) of the density of the density detection pattern detected with the density detection unit 161. Then, the density correction process execution unit 142*a* calculates a difference between the target density 405 and the detected value 410, thereby identifying a shift value 420 (refer to FIG. 5) of each of the duty portions from the target density 405.

In the embodiment, as described above, the shift value 420 (refer to FIG. 5) of each of the duty portions is identified. Accordingly, it is possible to determine the order of correcting (controlling) the exposure light energy of the exposure unit 111 and the developing energy of the developing unit 112*a*, and to calculate the correction values of the exposure light energy of the exposure unit 111 and the developing energy of the developing unit 112*a* (the correction values to be applied to one of the setting values of the exposure light energy of the exposure unit 111 and the developing energy of the developing unit 112*a*). Note that the density difference generation condition is stored in the density difference generation condition storage unit 152 in advance.

Figure 6:
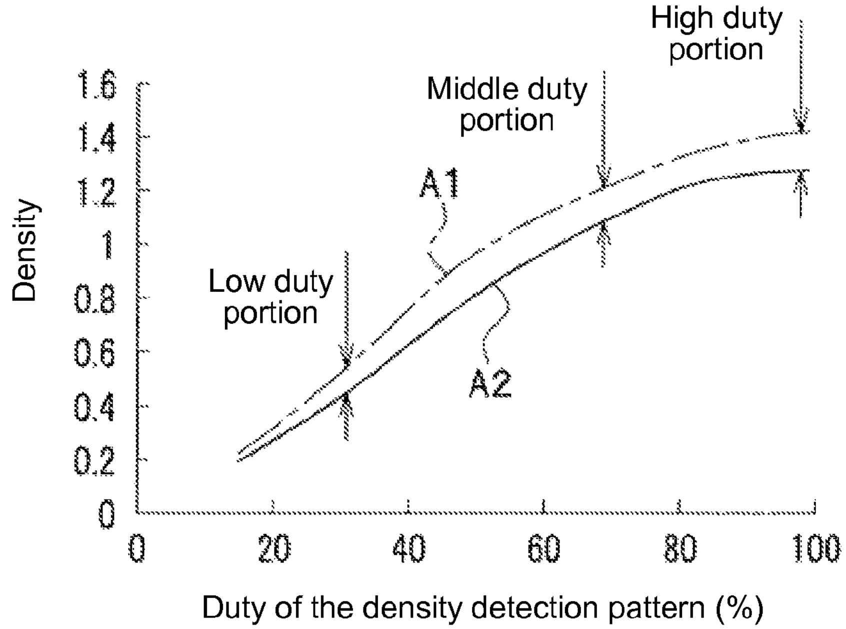
FIG. 6 is a graph showing a relationship between a density and a duty of the density detection pattern to determine a difference between a target density value and a detected value according to the first embodiment of the present invention.

An example of the target density value 405 and the detected value 410 will be explained next with reference to FIG. 6. FIG. 6 is a graph showing a relationship between the density and the duty of the density detection pattern to determine a difference between the target density value 405 and the detected value 410 according to the first embodiment of the present invention.

As shown in FIG. 6, there is the difference between the target density value 405 and the detected value 410. More specifically, a curve A1 represents the target density value 405, and a curve A2 represents the detected value 410 of the density of the density detection pattern. Further, the curve A2 represents the detected value 410 when the density is detected for the first time, that is, when color balance is not adjusted yet.

In step S425, the density correction process execution unit 142*a* compares the shift value 420 of each of the duty portions (refer to FIG. 5). Accordingly, the density correction process execution unit 142*a* determines which one of the low duty portion, the middle portion, and the high duty portion has a maximum value of the shift value 420 (referred to as a maximum shift portion).

In step S110 shown in FIG. 3, the density correction process execution unit 142*a* determines whether the maximum shift portion is the middle duty portion (the middle portion has the maximum value of the shift value 420). In step S430, the density correction process execution unit 142*a* determines the order of correcting (controlling) the exposure light energy of the exposure unit 111 and the developing energy of the developing unit 112*a* according to a determination result.

In the embodiment, as described above, the density correction process execution unit 142*a* determines the order of correcting (controlling) the exposure light energy of the exposure unit 111 and the developing energy of the developing unit 112*a* according to the determination result. Accordingly, it is possible to prevent the correction from being overly executed upon adjusting color balance when the order of correcting (controlling) the exposure light energy of the exposure unit 111 and the developing energy of the developing unit 112*a* is fixed. In other word, it is possible to prevent the correction value of the light amount of the correction value of the developing voltage from becoming excessively large.

In the conventional image forming apparatus using the LED light source, when the exposure energy is controlled, a print dot diameter is increased or decreased, thereby adjusting a distance between dots. In this adjustment, mainly the density of the middle duty portion is corrected, while the densities of the low duty portion and the high duty portion are not significantly corrected.

Figure 7:
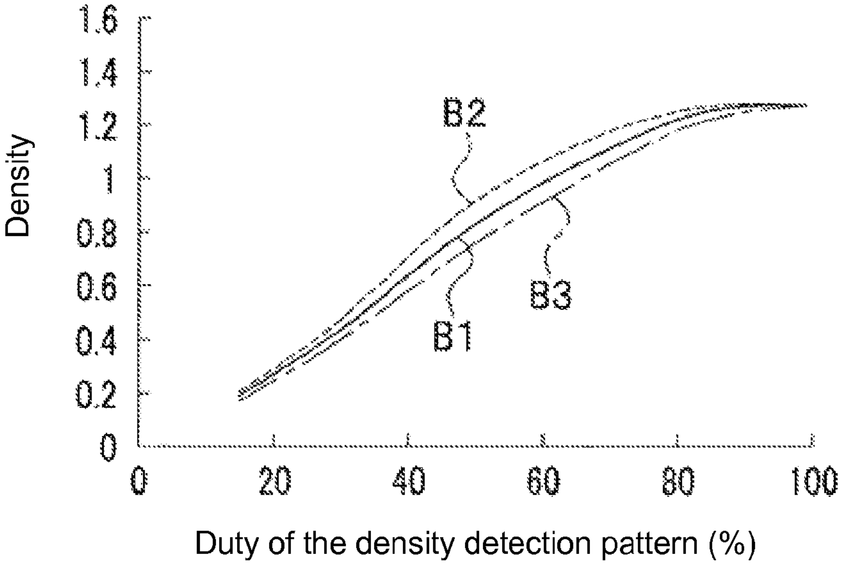
FIG. 7 CONVENTIONAL ART
FIG. 7 is a graph showing a relationship between the density and the duty of the density detection pattern to determine a change in a density characteristic of the density detection pattern after color balance is adjusted through controlling an exposure light energy in a conventional image forming apparatus.

An example of the adjustment described above will be explained with reference to FIG. 7. FIG. 7 is a graph showing a relationship between the density and the duty of the density detection pattern to determine a change in a density characteristic of the density detection pattern after color balance is adjusted through controlling the exposure light energy in the conventional image forming apparatus.

More specifically, in FIG. 7, a curve B1 represents the density characteristic of the density detection pattern when the exposure light energy is not corrected; a curve B2 represents the density characteristic of the density detection pattern when the exposure light energy is increased; and a curve B3 represents the density characteristic of the density detection pattern when the exposure light energy is decreased.

Figure 8:
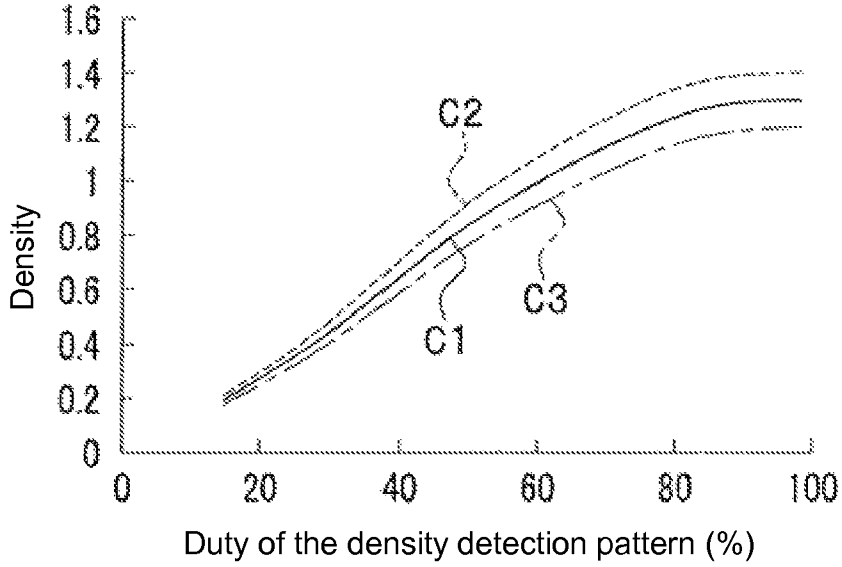
FIG. 8 CONVENTIONAL ART
FIG. 8 is a graph showing a relationship between the density and the duty of the density detection pattern to determine a change in the density characteristic of the density detection pattern after color balance is adjusted through controlling a developing energy in the conventional image forming apparatus.

In the conventional image forming apparatus using the LED light source, when the developing energy is controlled, the developing energy is corrected such that the maximum density value is fixed. Through this adjustment, in the conventional image forming apparatus using the LED light source, color balance of an image is adjusted, that is, an amount of developer to be transferred to the print medium is adjusted. In the adjustment, mainly the density of the high duty portion is corrected, while the densities of the low duty portion and the middle duty portion are not significantly corrected. Further, a change amount decreases with the print duty An example of the adjustment described above will be explained with reference to FIG. 8. FIG. 8 is a graph showing a relationship between the density and the duty of the density detection pattern to determine a change in the density characteristic of the density detection pattern after color balance is adjusted through controlling the developing energy in the conventional image forming apparatus.

More specifically, in FIG. 8, a curve C1 represents the density characteristic of the density detection pattern when the developing energy is not corrected; a curve C2 represents the density characteristic of the density detection pattern when the developing energy is increased; and a curve C3 represents the density characteristic of the density detection pattern when the developing energy is decreased.

When the order of controlling the exposure light energy and the developing energy is changed, a final energy correction amount may be different. More specifically, in the conventional image forming apparatus using the LED light source, the final energy correction amount may be different between the case where the exposure light energy is controlled in the first color balance adjustment and the developing energy is controlled in the second color balance adjustment, and the case where the developing energy is controlled in the first color balance adjustment and the exposure light energy is controlled in the second color balance adjustment. In other words, when one of the exposure light energy and the developing energy is controlled first, the other of the exposure light energy and the developing energy may be controlled by an amount different from the case in the reversed order.

Figure 9:
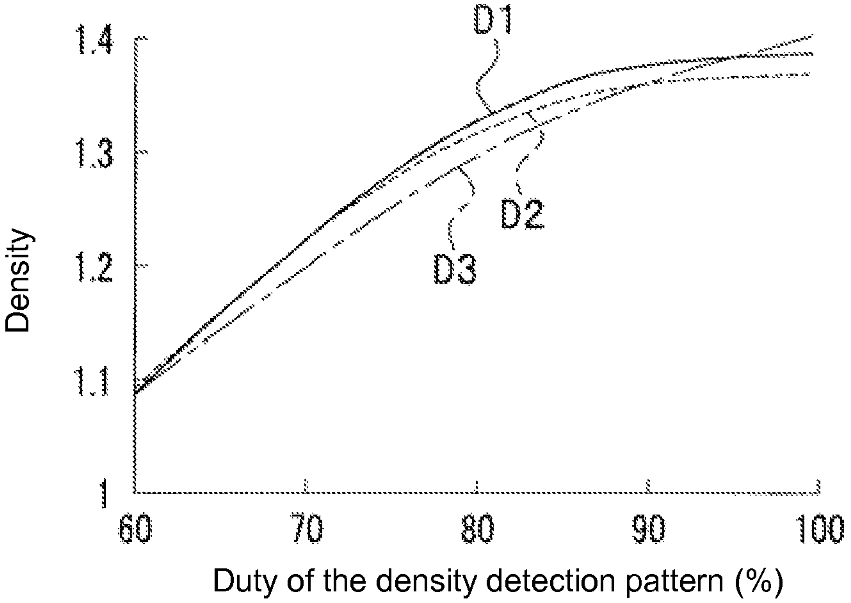
FIG. 9 CONVENTIONAL ART
FIG. 9 is a graph showing a relationship between the density and the duty of the density detection pattern to determine a change in the density characteristic of the density detection pattern after color balance is adjusted through controlling the exposure light energy and the developing energy in different orders in the conventional image forming apparatus.

An example of the adjustment described above will be explained with reference to FIG. 9. FIG. 9 is a graph showing a relationship between the density and the duty of the density detection pattern to determine a change in the density characteristic of the density detection pattern after color balance is adjusted through controlling the exposure light energy and the developing energy in different orders in the conventional image forming apparatus.

More specifically, in FIG. 9, a curve D1 represents the density characteristic of the density detection pattern when the developing energy is corrected first; a curve D2 represents the density characteristic of the density detection pattern when the exposure light energy is corrected first; and a curve D3 represents the target density (the target value of the density).

As described above, in the conventional image forming apparatus using the LED light source, when one of the exposure light energy and the developing energy is controlled in the fixed order for adjusting color balance, color balance may be overly adjusted. In other words, the light amount or the developing voltage may be adjusted by an excessive correction value. As a result, the conventional image forming apparatus may cause a print quality problem, thereby deteriorating printed image quality.

In the embodiment, the density correction process execution unit 142*a* determines whether the maximum shift portion is the middle duty portion. Then, the density correction process execution unit 142*a* determines the order of correcting the exposure light energy and the developing energy according to the determination result. Accordingly, in the image forming apparatus 100, it is possible to prevent the print quality problem, and to mainly correct the duty portion with the density to be corrected.

As shown in FIG. 3, in step S110, the density correction process execution unit 142*a* determines whether the maximum shift portion is the middle duty portion. When the density correction process execution unit 142*a* determines that the maximum shift portion is the middle duty portion in step S110 (Yes), the density correction process execution unit 142*a* calculates the correction value of the exposure light energy, and stores the correction value in the storage unit 150. A method of calculating the correction value will be explained later. Alternatively, the density correction control unit 142*b* may calculate the correction value.

In step S115, the density correction control unit 142*b* adjusts the exposure light energy in the first color balance adjustment before adjusting the developing energy according to the correction value of the exposure light energy stored in the storage unit 150.

In step S120, similar to step S105, the density correction process execution unit 142*a* prints and detects the density detection pattern. Accordingly, the density correction process execution unit 142*a* detects the density of the density detection pattern after the exposure light energy is adjusted.

In the next step, the density correction process execution unit 142*a* (or the density correction control unit 142*b*) calculates the correction value of the developing energy, and stores the correction value in the storage unit 150. In step S125, the density correction control unit 142*b* adjusts the developing energy in the second color balance adjustment according to the correction value of the developing energy stored in the storage unit 150.

When the density correction process execution unit 142*a* determines that the maximum shift portion is not the middle duty portion in step S110 (No) (that is, the maximum shift portion is the low duty portion or the high density portion), the density correction process execution unit 142*a* (or the density correction control unit 142*b*) calculates the correction value of the developing energy, and stores the correction value in the storage unit 150.

In step S130, the density correction control unit 142*b* adjusts the developing energy in the first color balance adjustment before adjusting the exposure light energy according to the correction value of the developing energy stored in the storage unit 150.

In step S135, similar to step S105, the density correction process execution unit 142*a* prints and detects the density detection pattern. Accordingly, the density correction process execution unit 142*a* detects the density of the density detection pattern after the developing energy is adjusted.

In the next step, the density correction process execution unit 142*a* (or the density correction control unit 142*b*) calculates the correction value of the developing energy, and stores the correction value in the storage unit 150. In step S140, the density correction control unit 142*b* adjusts the exposure light energy in the second color balance adjustment according to the correction value of the exposure light energy stored in the storage unit 150.

In the embodiment, when the density correction process execution unit 142*a* (or the density correction control unit 142*b*) adjusts the exposure light energy, the density correction process execution unit 142*a* (or the density correction control unit 142*b*) substitutes the density value thus detected into the following correction value calculation equation (1) to calculate the correction value of the light amount of the static latent image forming unit 125 (the exposure light energy), and stores the correction value in the storage unit 150.

Note that the light amount represents an amount corresponding to the exposure light energy. In this case, the light amount represents an exposure time relative to the photosensitive drum 114, that is, an exposure time of light irradiated from the LED light source to the photosensitive drum 114.

$$\text{Correction value of light amount}=[\{\text{high duty detected value}\times(\text{low duty target value}/\text{high duty target value})-\text{low duty detected value}\}/K1+\{\text{high duty detected value}\times(\text{middle duty target value}/\text{high duty target value})-\text{middle duty detected value}\}/K2]/2 \quad (1)$$

In the embodiment, when the density correction process execution unit 142*a* (or the density correction control unit 142*b*) adjusts the developing energy, the density correction process execution unit 142*a* (or the density correction control unit 142*b*) substitutes the density value thus detected into the following correction value calculation equation (2) to calculate the correction value of the developing voltage of the developing unit 112*a* (the developing energy), and stores the correction value in the storage unit 150.

$$\text{Correction value of developing voltage}=\{(\text{low duty target value}-\text{low duty detected value})\times W1/K3+(\text{middle duty target value}-\text{middle duty detected value})\times W2/K4+(\text{high duty target value}-\text{high duty detected value})\times W3/K5\}/(W1+W2+W3) \quad (2)$$

In the correction value calculation equations (1) and (2), the coefficient K1 is a density change ratio in the low duty portion per change unit of the light amount; the coefficient K2 is a density change ratio in the middle duty portion per change unit of the light amount; the coefficient K3 is a density change ratio in the low duty portion per change unit of the developing voltage; the coefficient K4 is a density change ratio in the middle duty portion per change unit of the developing voltage; and the coefficient K1 is a density change ratio in the middle duty portion per change unit of the developing voltage.

Further, in the correction value calculation equation (2), the coefficient W1 is a weighing coefficient of the low duty portion upon correcting the developing voltage; the coefficient W2 is a weighing coefficient of the middle duty portion upon correcting the developing voltage; and the coefficient W3 is a weighing coefficient of the high duty portion upon correcting the developing voltage. Note that the coefficients W1, W2, and W3 may have an arbitrary value.

In the embodiment, with the correction value calculation equation (1), it is possible to average the correction values of the light amount for correcting the light amount (the exposure light energy) in good balance regardless of darkness of the printed image.

More specifically, in the correction value calculation equation (1), a K1 dividing calculation portion is defined as "{high duty detected value×(low duty target value/high duty target value)−low duty detected value}/K1", and has a weighing coefficient of one. Similarly, a K2 dividing calculation portion is defined as "{high duty detected value×(middle duty target value/high duty target value)−middle duty detected value}/K2", and has a weighing coefficient of one. A sum of the K1 dividing calculation portion and the K2 dividing calculation portion is calculated, and is divided by two, i.e., a sum of the weighing coefficients, thereby averaging the correction values of the light amount.

In the embodiment, with the correction value calculation equation (2), it is possible to average the correction values of the developing voltage for correcting the developing voltage (the developing energy) in good balance regardless of darkness of the printed image.

More specifically, in the correction value calculation equation (2), a K3 dividing calculation portion is defined as "(low duty target value−low duty detected value)×W1/K3", and has a weighing coefficient of one. Similarly, a K4 dividing calculation portion is defined as "(middle duty target value−middle duty detected value)×W2/K4", and has a weighing coefficient of one. Similarly, a K5 dividing calculation portion is defined as "(high duty target value−high duty detected value)×W3/K5", and has a weighing coefficient of one. A sum of the K3 dividing calculation portion, the K4 dividing calculation portion, and the K5 dividing calculation portion is calculated, and is divided by three, i.e., a sum of the weighing coefficients, thereby averaging the correction values of the developing voltage.

In the embodiment, the density correction process execution unit 142*a* determines the order of correcting the exposure light energy of the exposure unit 111 and the developing energy of the developing unit 112*a* individually per each color of developer (toner). Further, it is configured such that each of the exposure light energy of the exposure unit 111 and the developing energy of the developing unit 112*a* is corrected once. Alternatively, it may be configured such that the developing energy of the developing unit 112*a* is corrected twice through performing the correction of the developing energy according to the correction of the exposure light energy.

In the embodiment, it is configured such that both of the exposure light energy of the exposure unit 111 and the developing energy of the developing unit 112*a* are corrected. Alternatively, it may be configured such that one of the exposure light energy of the exposure unit 111 and the developing energy of the developing unit 112*a* is not corrected when it is determined that it is not necessary to perform the correction of one of the exposure light energy and the developing energy after the other of the exposure light energy and the developing energy is corrected.

As described above, when the correction in the high duty portion is mainly performed, even though the correction in the middle duty portion should be performed, the developing energy may be corrected by an excessively large correction value, thereby causing a print quality problem such as a smeared image. In the image forming apparatus 100, it is possible to prevent such a print quality problem.

Further, when the correction in the middle duty portion is mainly performed, even though the correction in the high duty portion should be performed, the exposure light energy may be corrected by an excessively large correction value. As a result, the LED light source may have variance in an emitting light intensity, and a lateral streak may be generated during the printing operation. In the image forming apparatus 100, it is possible to prevent such a print quality problem. Accordingly, it is possible to prevent printed image quality from deteriorating due to the over correction.

Second Embodiment

A second embodiment of the present invention will be explained next. In the second embodiment, even when the density correction process execution unit 142*a* determines that the control of the exposure light energy is performed first, if it is considered that a lateral streak may be generated, it is configured such that the control of the developing energy, not the exposure light energy, is performed first.

Figure 10:
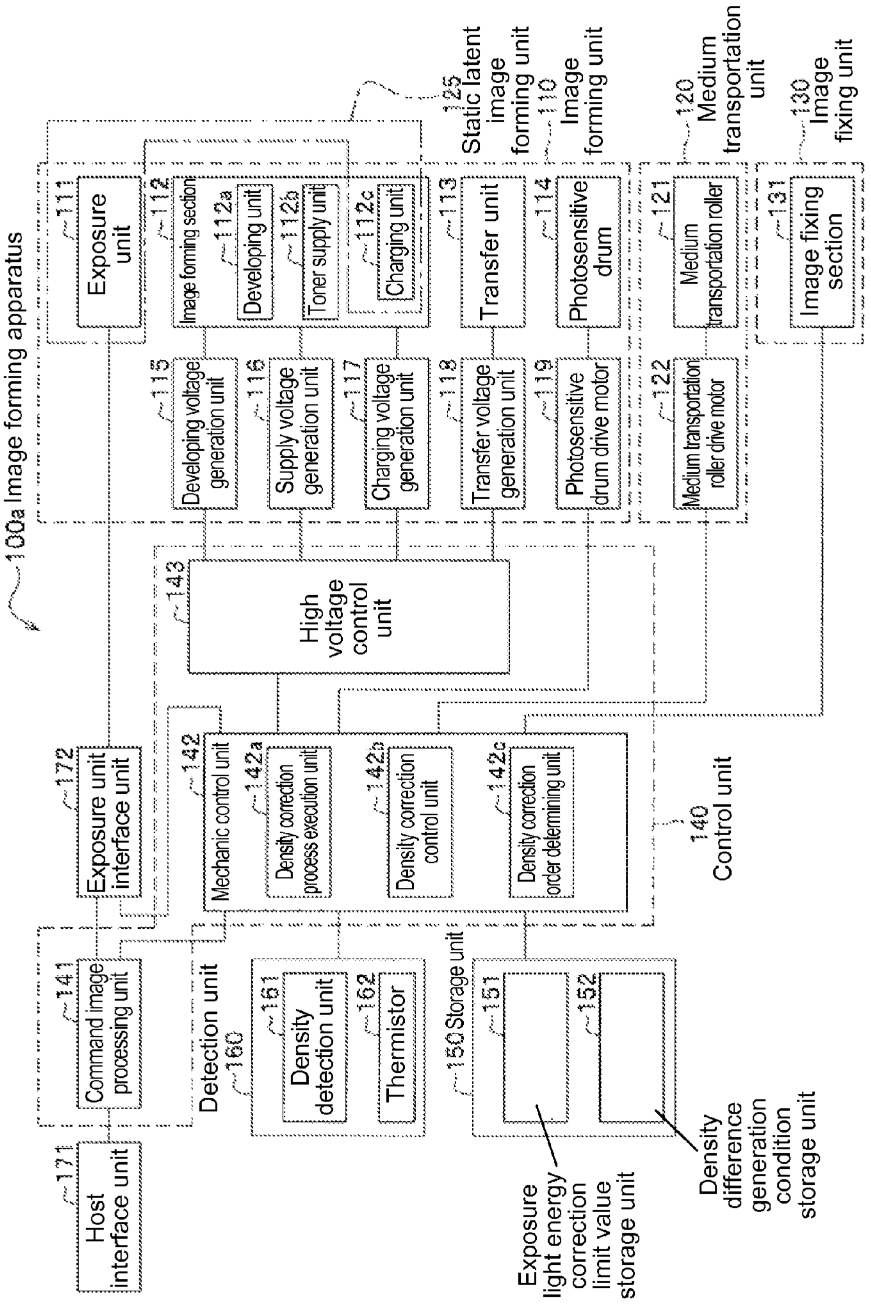
FIG. 10 is a block diagram showing a configuration of an image forming apparatus according to a second embodiment of the present invention.

A configuration of an image forming apparatus 100*a* according to the second embodiment of the present invention will be explained with reference to FIG. 10. FIG. 10 is a block diagram showing the configuration of the image forming apparatus 100*a* according to the second embodiment of the present invention.

As shown in FIG. 10, different from the image forming apparatus 100 in the first embodiment, the image forming apparatus 100*a* includes a density correction order determining unit 142*c* in the mechanic control unit 142.

In the embodiment, the density correction order determining unit 142*c* is provided for changing the order of the control of the exposure light energy and the developing energy determined with the mechanic control unit 142 according to a predetermined condition.

More specifically, even when the density correction process execution unit 142*a* determines that the control of the exposure light energy is performed first, the density correction order determining unit 142*c* changes the order of the control of the exposure light energy and the developing energy, so that the control of the developing energy, not the exposure light energy, is performed first when the correction value of the exposure light energy deviates significantly from a specific value, for example, a limit value defined as a 15% value in advance.

In the second embodiment, different from the image forming apparatus 100 in the first embodiment, the image forming apparatus 100*a* performs a different operation when the control of the exposure light energy is performed and the correction value of the exposure light energy reaches the limit value, i.e., an exposure light energy correction limit value.

Figure 11:
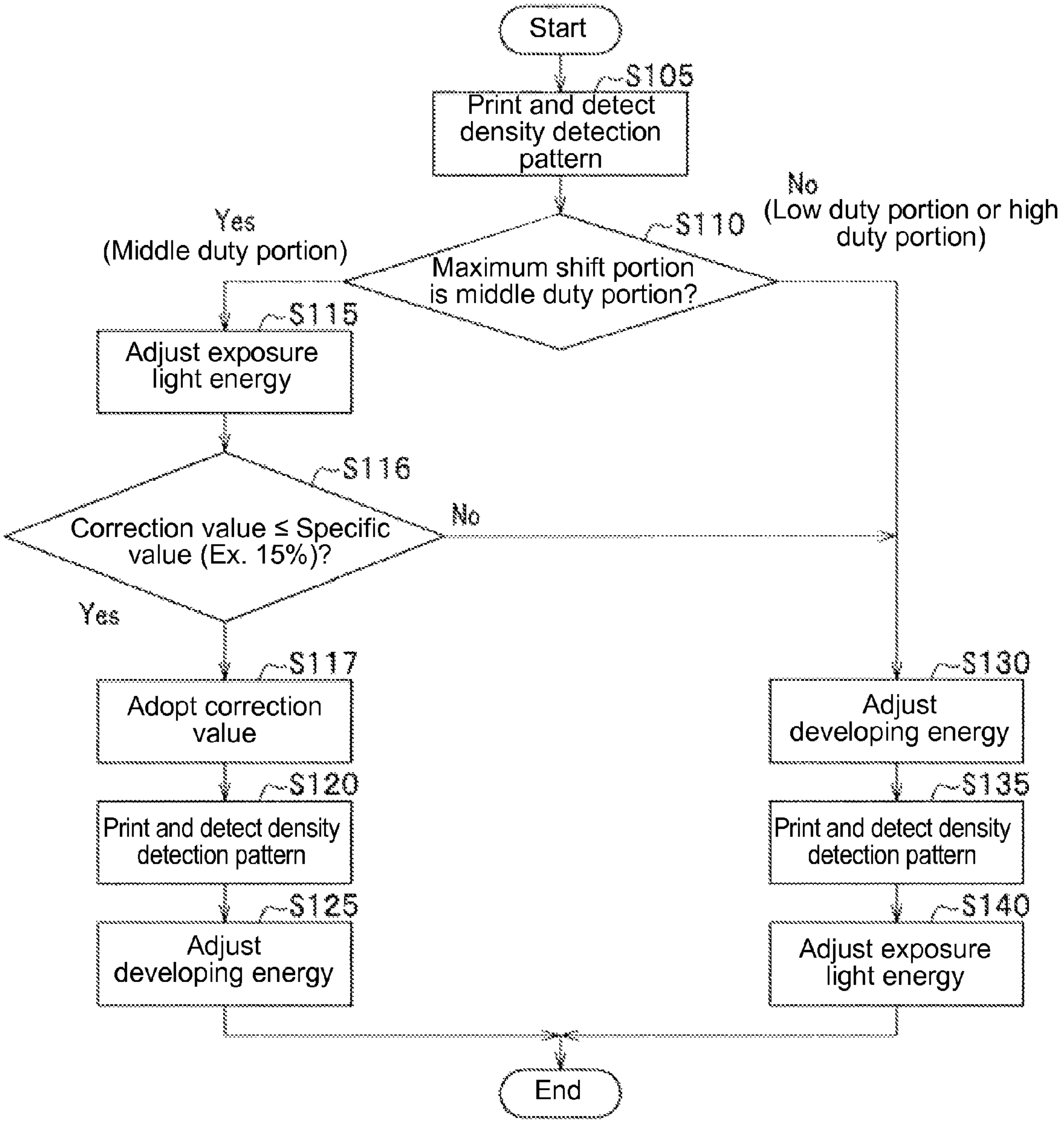
FIG. 11 is a flow chart showing a method of adjusting color balance applied to the image forming apparatus according to the second embodiment of the present invention.
Figure 12:
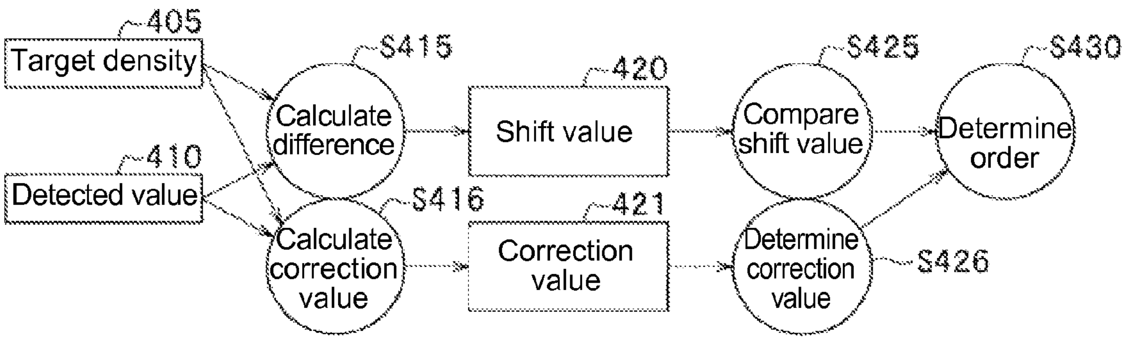
FIG. 12 is a schematic view showing a data flow of the method of adjusting color balance applied to the image forming apparatus according to the second embodiment of the present invention.

An operation of the image forming apparatus 100*a* for adjusting color balance will be explained next with reference to FIGS. 11 and 12. FIG. 11 is a flow chart showing a method of adjusting color balance applied to the image forming apparatus 100*a* according to the second embodiment of the present invention. FIG. 12 is a schematic view showing a data flow of the method of adjusting color balance applied to the image forming apparatus 100*a* according to the second embodiment of the present invention.

In the following description, features of the operation of the image forming apparatus 100*a* different from those of the operation of the image forming apparatus 100 in the first embodiment are mainly explained. Other features of the operation of the image forming apparatus 100*a* similar to those of the operation of the image forming apparatus 100 in the first embodiment are considered to be the same, and explanations thereof are omitted.

As shown in FIG. 11, the image forming apparatus 100*a* performs step S116 and step S117 between step S115 (the control of the exposure light energy) and step S120 (the printing and detection of the density detection pattern). In this case, in the image forming apparatus 100*a*, the density correction process execution unit 142*a* (or the density correction control unit 142*b*) performs the correction value calculation (refer to step S416 in FIG. 12) to calculate a correction value 421 of the exposure light energy (refer to FIG. 12), and stores the correction value 421 in the storage unit 150.

More specifically, after the image forming apparatus 100*a* performs step S115, the density correction order determining unit 142*c* refers to the specific value stored in the exposure light energy correction limit value storage unit 151 in advance to compare the specific value with the correction value 421 of the exposure light energy stored in the storage unit 150 and calculated in step S115. Accordingly, in step S116, the density correction order determining unit 142*c* determines whether the correction value 421 of the exposure light energy is less than the specific value, for example, 15% in the second embodiment.

In step S117, when the density correction order determining unit 142*c* determines that the correction value 421 of the exposure light energy is less than the specific value in step S116 (Yes), the density correction order determining unit 142*c* adopts the correction value 421 for the control of the exposure light energy, that is, the control of the exposure light energy is performed first.

When the density correction order determining unit 142*c* determines that the correction value 421 of the exposure light energy is not less than the specific value in step S116 (No), the density correction order determining unit 142*c* determines that the control of the developing energy is performed first. In this case, the process proceeds to step 5130. In step S130, the density correction control unit 142*b* performs the control of the developing energy.

In the embodiment, the specific value is not limited to 15%, and may be set arbitrarily. When the amount of the exposure light energy is changed, the LED light source tends to have a variance in the emitting light intensity, thereby causing a lateral streak during the printing operation.

In the second embodiment, when the exposure time of the LED light source is changed (corrected) to a large extent, a lateral streak tends to be generated more easily. Accordingly, the specific value, i.e., a threshold value relative to the correction value of the exposure light energy, is set to 15%, and may be adjusted according to an operational environment of the image forming apparatus 100*a*, a type of print data, and the like.

In the second embodiment, the exposure unit 111 stores a reference condition corresponding to each of LED elements for correcting an emitted light amount to compensate a variance in the LED elements due to manufacturing variances. The reference condition corresponding to each of the LED elements is sent to the mechanic control unit 142 through the exposure unit interface unit 172. Accordingly, the mechanic control unit 142 determines a light emitting time of each of the LED elements, a voltage to be applied to each of the LED elements, and a current to be applied to each of the LED elements according to the reference condition corresponding to each of the LED elements, so that a toner image with a specific toner density (for example, a 100% duty image) is formed under an ideal operational environment without correction.

In this case, when the exposure unit 111 emits light through the exposure unit interface unit 172, the emitted light energy of each of the LED elements is defined as 100% of the emitted light energy as the specific value. Accordingly, the mechanic control unit 142 determines whether the correction less than 15% (the correction within 85% to 115% of the emitted light energy) is applied to the specific value, i.e., 100% of the emitted light energy of each of the LED elements, as the correction of the current operational environment in order to form the toner image with the specific toner density (for example, a 100% duty image).

In the image forming apparatus 100*a* in the second embodiment, similar to the image forming apparatus 100 in the first embodiment, the density correction process execution unit 142*a* determines the order of correcting the exposure light energy of the exposure unit 111 and the developing energy of the developing unit 112*a* individually per each color of developer (toner). Further, similar to the image forming apparatus 100 in the first embodiment, it may be configured such that the developing energy of the developing unit 112*a* is corrected twice through performing the correction of the developing energy according to the correction of the exposure light energy.

As described above, when the correction in the high duty portion is mainly performed, even though the correction in the middle duty portion should be performed, the developing energy may be corrected by an excessively large correction value, thereby causing a print quality problem such as a smeared image. In the image forming apparatus 100*a* in the second embodiment, similar to the image forming apparatus 100 in the first embodiment, it is possible to prevent such a print quality problem.

Further, when the correction in the middle duty portion is mainly performed, even though the correction in the high duty portion should be performed, the exposure light energy may be corrected by an excessively large correction value. As a result, the LED light source may have variance in an emitting light intensity, and a lateral streak may be generated during the printing operation. In the image forming apparatus 100*a* in the second embodiment, similar to the image forming apparatus 100 in the first embodiment, it is possible to prevent such a print quality problem. Accordingly, it is possible to prevent printed image quality from deteriorating due to the over correction.

Further, in the second embodiment, even when the density correction process execution unit 142*a* determines that the control of the exposure light energy is performed first, if it is considered that a lateral streak may be generated (that is, the correction value of the exposure light energy deviates significantly from the specific value set in advance), it is configured such that the control of the developing energy, not the exposure light energy, is performed first. Accordingly, as compared with the image forming apparatus 100 in the first embodiment, it is possible to more accurately prevent print quality problem.

Third Embodiment

A third embodiment of the present invention will be explained next.

In a conventional image forming apparatus using a LED light source, a limit value of a correction value of the exposure energy light is determined in advance for controlling the exposure light energy. Accordingly, when the exposure light energy is controlled, the correction value of the exposure light energy is calculated such that the correction value of the exposure light energy is within a range from a target value by the limit value, thereby controlling the exposure light energy according to the correction value.

As described above, in the conventional image forming apparatus using the LED light source, the exposure light energy is controlled within the range of the limit value. Accordingly, when the developing energy is controlled after the exposure light energy is controlled, the correction value of the developing energy may be excessively increased. As a result, in the conventional image forming apparatus using the LED light source, developer (toner) may be overly charged during the printing operation, or developer may be charged with a polarity opposite to a normal polarity. As a result, a print quality problem such as a smeared image may happen, thereby deteriorating printed image quality. Further, the correction value of the exposure light energy reaches the limit value, so that a lateral streak tends to be generated in the printing operation.

In the third embodiment, the developing energy is corrected twice through performing the correction of the developing energy according to the correction of the exposure light energy. Accordingly, it is possible to prevent the risks described above.

In an image forming apparatus 100*b* in the third embodiment, different from the image forming apparatus 100 in the first embodiment and the image forming apparatus 100*a* in the second embodiment, a different operation is performed when the exposure light energy is controlled and the correction value of the exposure light energy reaches the exposure light energy correction limit value as the limit value.

Figure 13:
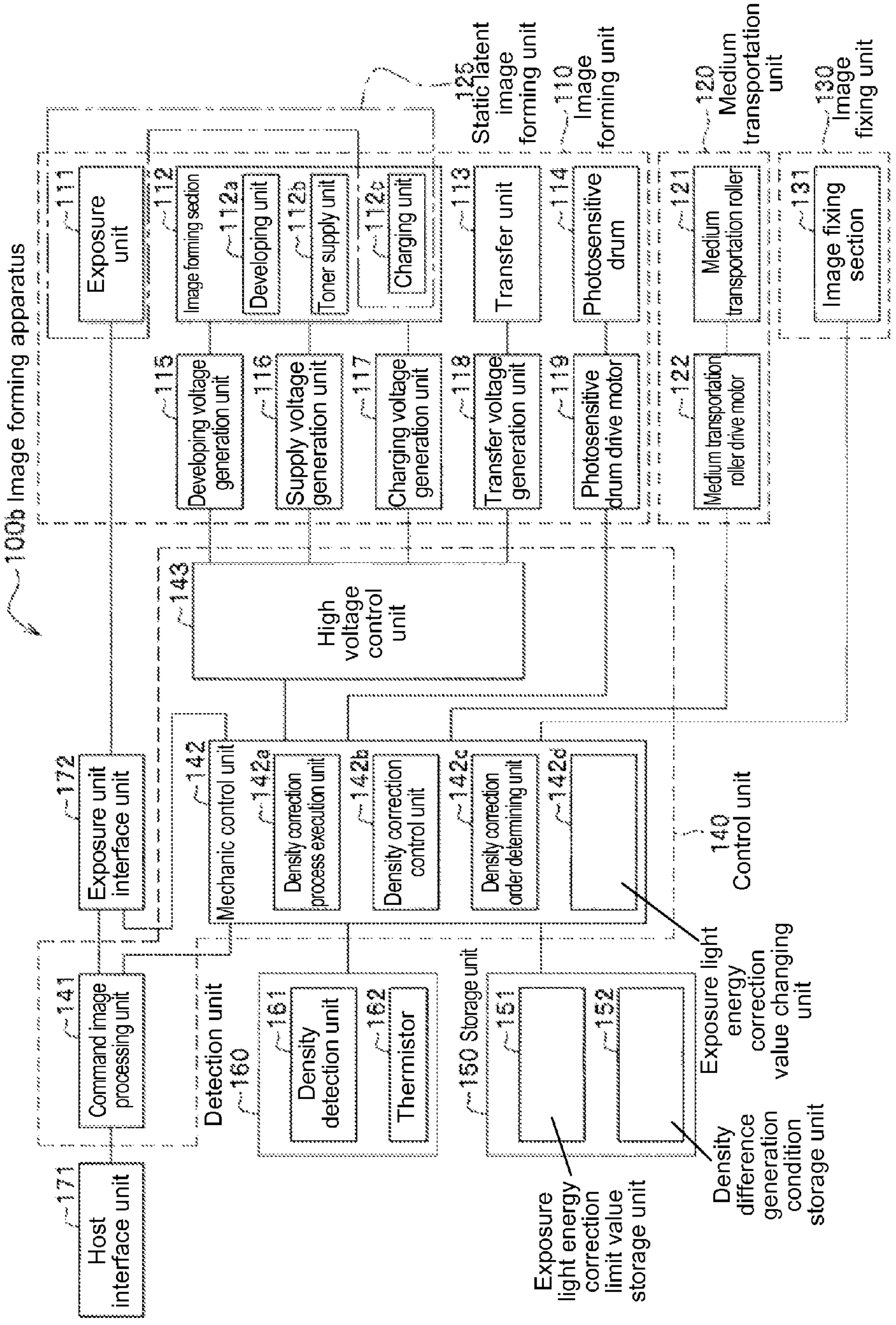
FIG. 13 is a block diagram showing a configuration of an image forming apparatus according to a third embodiment of the present invention.

A configuration of the image forming apparatus 100*b* according to the third embodiment of the present invention will be explained with reference to FIG. 13. FIG. 13 is a block diagram showing the configuration of the image forming apparatus 100*b* according to the third embodiment of the present invention.

As shown in FIG. 13, different from the image forming apparatus 100*a* in the second embodiment, the image forming apparatus 100*b* includes an exposure light energy correction value changing unit 142*d* in the mechanic control unit 142. Further, the image forming apparatus 100*b* includes the exposure light energy correction limit value storage unit 151 in the storage unit 150.

In the embodiment, the exposure light energy correction value changing unit 142*d* is provided for changing the correction value of the exposure light energy calculated with the density correction process execution unit 142*a* (or the density correction order determining unit 142*c*). More specifically, the exposure light energy correction value changing unit 142*d* determines whether the correction value of the exposure light energy is greater than a specific value, for example, a limit value set as 15% in advance in the third embodiment.

When the exposure light energy correction value changing unit 142*d* determines that the correction value of the exposure light energy is greater than the specific value, the exposure light energy correction value changing unit 142*d* changes the correction value of the exposure light energy.

In the embodiment, the exposure light energy correction value changing unit 142*d* changes the correction value of the exposure light energy to 50% of the correction value of the exposure light energy calculated.

Figure 14:
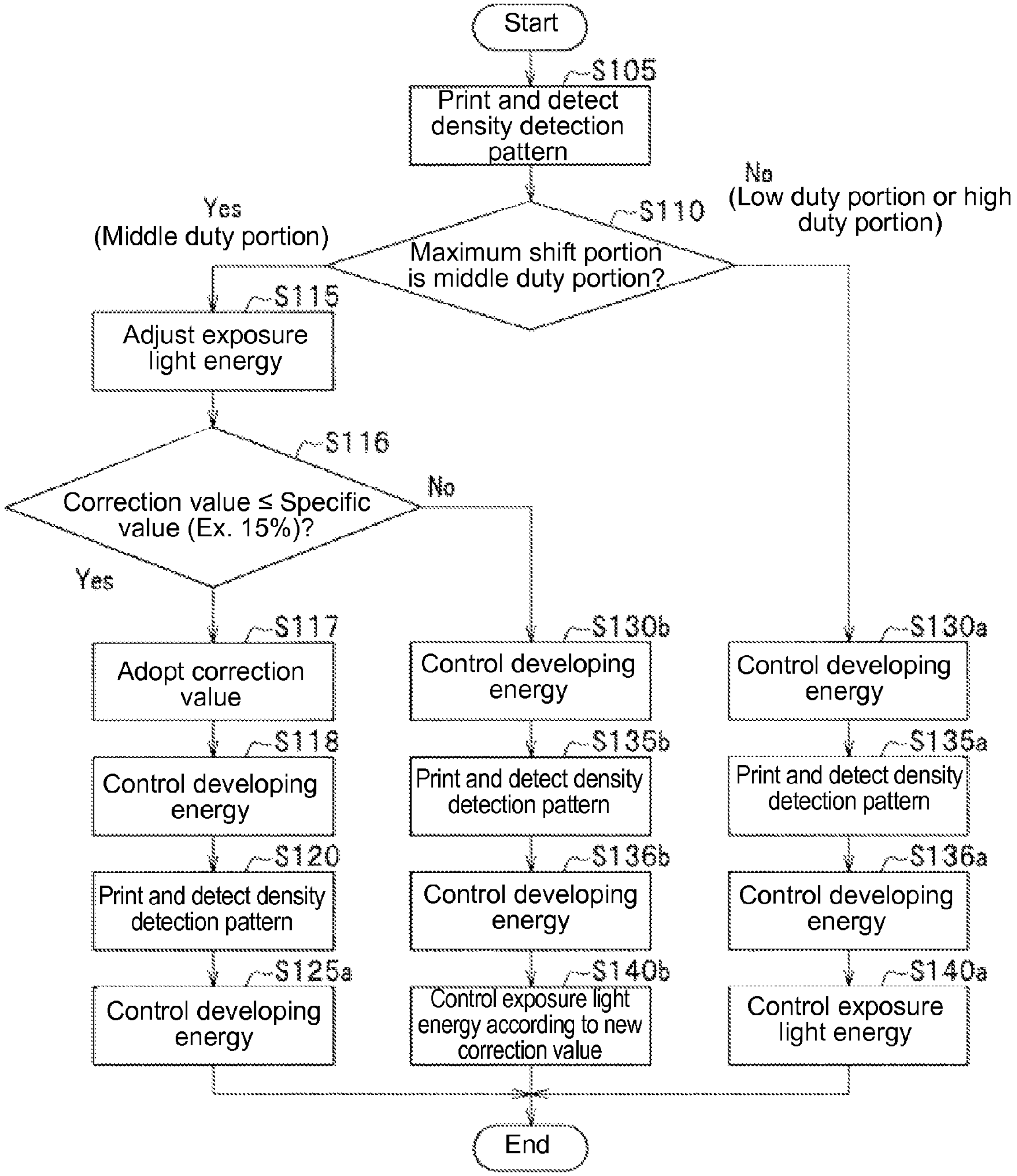
FIG. 14 is a flow chart showing a method of adjusting color balance applied to the image forming apparatus according to the third embodiment of the present invention.
Figure 15:
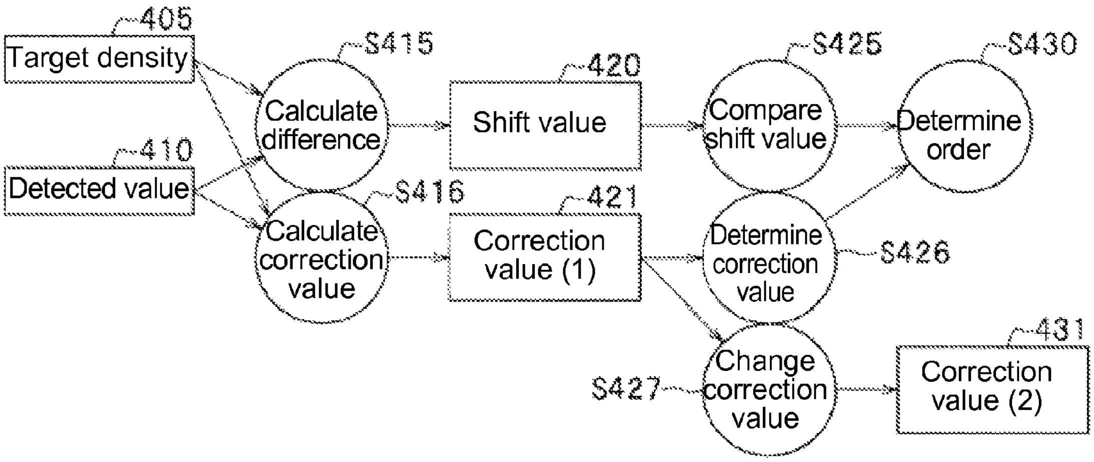
FIG. 15 is a schematic view showing a data flow of the method of adjusting color balance applied to the image forming apparatus according to the third embodiment of the present invention.

An operation of the image forming apparatus 100*b* for adjusting color balance will be explained next with reference to FIGS. 14 and 15. FIG. 14 is a flow chart showing a method of adjusting color balance applied to the image forming apparatus 100*b* according to the third embodiment of the present invention. FIG. 15 is a schematic view showing a data flow of the method of adjusting color balance applied to the image forming apparatus 100*b* according to the third embodiment of the present invention.

In the following description, features of the operation of the image forming apparatus 100*b* different from those of the operation of the image forming apparatus 100 in the first embodiment and the image forming apparatus 100*a* in the second embodiment are mainly explained. Other features of the operation of the image forming apparatus 100*b* similar to those of the operation of the image forming apparatus 100 in the first embodiment and the image forming apparatus 100*a* in the second embodiment are considered to be the same, and explanations thereof are omitted. Further, in FIG. 14, steps similar to those in FIG. 11 are designated with the same reference numerals with characters a or b, and explanations thereof are omitted.

As shown in FIG. 14, the image forming apparatus 100*b* performs step S118 (the control of the developing energy) between step S117 (the adoption of the correction value 421 for the control of the exposure light energy) and step S120 (the printing and detection of the density detection pattern). More specifically, after the density correction order determining unit 142*c* adopts the correction value 421 for the control of the exposure light energy in step S117, in step S118, the image forming apparatus 100*b* performs the control of the developing energy for the first time. Further, in step S125*a*, the image forming apparatus 100*b* performs the control of the developing energy for the second time.

It is supposed that, at this moment, in the image forming apparatus 100*b* in the embodiment, similar to the image forming apparatus 100*a* in the second embodiment, in step S115, the density correction process execution unit 142*a* (or the density correction control unit 142*b*) performs the correction value calculation (refer to step S416 in FIG. 15) to calculate the correction value 421 of the exposure light energy (refer to FIG. 15), and stores the correction value 421 in the storage unit 150.

When the density correction process execution unit 142*a* determines that the maximum shift portion is not the middle duty portion in step S110 (No), similar to step S130, the image forming unit 110*b* performs the control of the developing energy before performing the control of the exposure light energy in step S130*a*. Further, similar to step S135 (refer to FIG. 3), the density correction process execution unit 142*a* prints and detects the density detection pattern. Accordingly, the density correction process execution unit 142*a* detects the density of the density detection pattern after the developing energy is adjusted.

Afterward, the image forming apparatus 100*b* concurrently performs the control of the exposure light energy and the control of the developing energy. More specifically, in step S136*a*, similar to step S130 (refer to FIG. 3), the image forming apparatus 100*b* performs the control of the developing energy for the second time. Further, in step S140*a*, similar to step S140 (refer to FIG. 3), the image forming apparatus 100*b* performs the control of the exposure light energy.

When the density correction order determining unit 142*c* determines that the correction of the exposure light energy is not less than the specific value in step S116 (No), similar to step S130*a*, the image forming unit 110*b* performs the control of the developing energy before performing the control of the exposure light energy in step S130*b*. Further, similar to step S135*a*, the density correction process execution unit 142*a* prints and detects the density detection pattern in step S135*b*. Accordingly, the density correction process execution unit 142*a* detects the density of the density detection pattern after the developing energy is adjusted.

Afterward, the image forming apparatus 100*b* concurrently performs the control of the exposure light energy and the control of the developing energy. More specifically, in step S136*b*, similar to step S136*a*, the image forming apparatus 100*b* performs the control of the developing energy for the second time. Further, in step S140*b*, similar to step S140*a*, the image forming apparatus 100*b* performs the control of the exposure light energy.

In the embodiment, in step S140*b*, the exposure light energy correction value changing unit 142*d* of the image forming apparatus 100*b* performs the control of the exposure light energy according to a new correction value different from the correction value used in step S115 (referred to as the correction value (1) 421 of the exposure light energy shown in FIG. 15).

More specifically, in step S140*b*, the exposure light energy correction value changing unit 142*d* compares a specific value or the limit value set in advance, for example, 15% in the third embodiment, with the correction value (1) 421 of the exposure light energy used in step S115. Accordingly, the exposure light energy correction value changing unit 142*d* determines whether the correction value (1) 421 of the exposure light energy is greater than the specific value (refer to step S426 in FIG. 15).

When the exposure light energy correction value changing unit 142*d* determines whether the correction value (1) 421 of the exposure light energy is greater than the specific value, the exposure light energy correction value changing unit 142*d* determines to change from the correction value (1) 421 to the new correction value (refer to step S427 in FIG. 15).

When the exposure light energy correction value changing unit 142*d* determines to change to the new correction value (referred to as a correction value (2) 431 shown in FIG. 15), the exposure light energy correction value changing unit 142*d* calculates the correction value (2) 431 less than the correction value (1) 421 (more specifically, 50% of the correction value (1) 421). Afterward, the image forming apparatus 100*b* performs the control of the exposure light energy according to the new correction value, i.e., the correction value (2) 431 of the exposure light energy.

In the embodiment, the correction value (2) 431 of the exposure light energy is not limited to 50% of the correction value (1) 421, and may be set arbitrarily according to the specific value, i.e., the limit value set in advance, for example, 15% in the third embodiment, and a control unit, i.e., a ratio defining an amount of the exposure light energy to be change per which %.

For example, when the specific value is set to a relatively large value such as when it is determined to be acceptable through an experiment and the like even when the amount of the exposure light energy is changed to a relatively large extent, the correction value (2) 431 of the exposure light energy may exceed 50% of the correction value (1) 421.

On the other hand, when the specific value is set to a relatively small value such as when it is determined to cause a risk of an image quality problem when the amount of the exposure light energy is changed, the correction value (2) 431 of the exposure light energy should be less than 50% of the correction value (1) 421.

In the image forming apparatus 100*b* in the third embodiment, similar to the image forming apparatus 100*a* in the second embodiment, the density correction process execution unit 142*a* determines the order of correcting the exposure light energy of the exposure unit 111 and the developing energy of the developing unit 112*a* individually per each color of developer (toner).

As described above, in the image forming apparatus 100*b* in the third embodiment, in addition to the effects of the image forming apparatus 100*a* in the second embodiment, even when developer (toner) is overly charged during the printing operation, or developer is charged with a polarity opposite to a normal polarity, it is possible to prevent printed image quality from deteriorating and a lateral streak.

The disclosure of Japanese Patent Application No. 2009-156514, filed on Jul. 1, 2009, is incorporated in the application.

While the invention has been explained with reference to the specific embodiments of the invention, the explanation is illustrative and the invention is limited only by the appended claims.

What is claimed is:

1. An image forming apparatus capable of adjusting a print density with a plurality of set values including a first set value and a second set value, comprising:

a first unit arranged to operate according to the first set value;

a second unit arranged to operate according to the second set value;

a storage unit for storing a first density as a target value of the print density;

a density detection unit for detecting a second density as a print density of an image printed on a transfer medium; and a control unit for adjusting the print density, wherein said control unit is arranged to compare the first density and the second density, said control unit is arranged to correct the first set value and the second set value according to a comparison result, and said control unit is arranged to determine an order of an operation of the first unit according to the first set value thus corrected and an operation of the second unit according to the second set value thus corrected according to the comparison result and a predetermined condition.

2. The image forming apparatus according to claim 1, wherein said density detection unit is arranged to detect the second density after the control unit corrects one of the first set value and the second set value, said control unit being arranged to compare the first density and the second density after the control unit corrects the one of the first set value and the second set value, and to calculate a correction value to be applied to the other of the first set value and the second set value for correcting the second density to the first density, said control unit being arranged to correct the other of the first set value and the second set value according to the correction value for adjusting color balance.

3. The image forming apparatus according to claim 2, wherein said control unit is arranged to calculate the correction value for adjusting a light amount corresponding to an exposure light energy when the correction value is used for adjusting an energy amount of a static latent image forming unit as the first unit, said control unit being arranged to calculate the correction value expressed with an equation (1), $$\text{the correction value}=[\{\text{high duty detected value}\times(\text{low duty target value}/\text{high duty target value})-\text{low duty detected value}\}/K1+\{\text{high duty detected value}\times(\text{middle duty target value}/\text{high duty target value})-\text{middle duty detected value}\}/K2]/2 \quad (1)$$

where K1 is a density change ratio of a low duty density detection pattern per change unit of the light amount, and K2 is a density change ratio of a middle duty density detection pattern per change unit of the light amount.

4. The image forming apparatus according to claim 2, wherein said control unit is arranged to calculate the correction value for adjusting a developing voltage when the correction value is used for adjusting an energy amount of a developing unit as the second unit, said control unit being arranged to calculate the correction value expressed with an equation (2), $$\text{the correction value}=\{(\text{low duty target value}-\text{low duty detected value})\times W1/K3+(\text{middle duty target value}-\text{middle duty detected value})\times W2/K4+(\text{high duty target value}-\text{high duty detected value})\times W3/K5\}/(W1+W2+W3) \quad (2)$$

where K3 is a density change ratio of a low duty density detection pattern per change unit of the developing voltage; K4 is a density change ratio of a middle duty density detection pattern per change unit of the developing voltage; K1 is a density change ratio of a middle duty density detection pattern per change unit of the developing voltage; W1 is a weighing coefficient of the low duty density detection pattern upon correcting the developing voltage; W2 is a weighing coefficient of the middle duty density detection pattern upon correcting the developing voltage; and W3 is a weighing coefficient of the high duty density detection pattern upon correcting the developing voltage.

5. The image forming apparatus according to claim 1, wherein said control unit is arranged to determine the order according to the predetermined condition determined in advance according to a range of the print density of the image printed on the transfer medium.

6. The image forming apparatus according to claim 1, further comprising an image supporting member for forming a static latent image thereon through exposure; an exposure unit as the first unit for exposing the image supporting member; and a developing unit as the second unit for attaching developer to the static latent image to form a developer image when a voltage is applied thereto, said control unit being arranged to use the one of the first set value and the second set value for controlling the exposure unit.

7. The image forming apparatus according to claim 6, wherein said control unit is arranged to use the other of the first set value and the second set value for setting the voltage applied to the developing unit.

8. The image forming apparatus according to claim 1, further comprising a static latent image forming unit having a charging unit for charging an image supporting member and an exposure unit as the first unit for forming a static latent image on the image supporting member; an image forming unit having a developing unit as the second unit for attaching developer to the static latent image to form a developer image; and a transfer unit for transferring the developer image to a transfer medium, said density detection unit being arranged to detect the second density of the image transferred with the transfer unit, said control unit being arranged to compare the first density and the second density, and to calculate a correction value according to the predetermined condition, said control unit being arranged to correct the one of the first set value and the second set value according to the correction value for adjusting color balance.

9. An image forming apparatus capable of adjusting a print density with a plurality of set values including a first set value and a second set value, comprising:

- a storage unit for storing a first density as a target value of the print density;
- a density detection unit for detecting a second density as a print density of an image printed on a transfer medium; and
- a control unit for adjusting the print density, said control unit being arranged to compare the first density and the second density, and to calculate a first correction value to be applied to one of the first set value and the second set value for correcting the second density to the first density according to a density difference generation condition determined in advance, said control unit being arranged to correct the one of the first set value and the second set value according to the first correction value for adjusting color balance,
- wherein said control unit is arranged to calculate the first correction value for adjusting a light amount corresponding to an exposure light energy when the first correction value is used for adjusting an energy amount of a static latent image forming unit, said control unit being arranged to calculate the first correction value expressed with an equation (1), $$\text{the first correction value}=[\{\text{high duty detected value}\times(\text{low duty target value}/\text{high duty target value})-\text{low duty detected value}\}/K1+\{\text{high duty detected value}\times(\text{middle duty target value}/\text{high duty target value})-\text{middle duty detected value}\}/K2]/2 \quad (1)$$

where K1 is a density change ratio of a low duty density detection pattern per change unit of the light amount, and K2 is a density change ratio of a middle duty density detection pattern per change unit of the light amount.

10. An image forming apparatus capable of adjusting a print density with a plurality of set values including a first set value and a second set value, comprising:

- a storage unit for storing a first density as a target value of the print density;
- a density detection unit for detecting a second density as a print density of an image printed on a transfer medium; and a control unit for adjusting the print density, said control unit being arranged to compare the first density and the second density, and to calculate a first correction value to be applied to one of the first set value and the second set value for correcting the second density to the first density according to a density difference generation condition determined in advance, said control unit being arranged to correct the one of the first set value and the second set value according to the first correction value for adjusting color balance, wherein said control unit is arranged to calculate the first correction value for adjusting a developing voltage when the first correction value is used for adjusting an energy amount of a developing unit, said control unit being arranged to calculate the first correction value expressed with an equation (2), $$\text{the first correction value}=\{(\text{low duty target value}-\text{low duty detected value})\times W1/K3+(\text{middle duty target value}-\text{middle duty detected value})\times W2/K4+(\text{high duty target value}-\text{high duty detected value})\times W3/K5\}/(W1+W2+W3) \quad (2)$$

where K3 is a density change ratio of a low duty density detection pattern per change unit of the developing voltage; K4is a density change ratio of a middle duty density detection pattern per change unit of the developing voltage; K1 is a density change ratio of a middle duty density detection pattern per change unit of the developing voltage; W1 is a weighing coefficient of the low duty density detection pattern upon correcting the developing voltage; W2 is a weighing coefficient of the middle duty density detection pattern upon correcting the developing voltage; and W3 is a weighing coefficient of the high duty density detection pattern upon correcting the developing voltage.

11. An image forming apparatus capable of adjusting a print density with a plurality of set values including a first set value and a second set value, comprising:

a storage unit for storing a first density as a target value of the print density;

a density detection unit for detecting a second density as a print density of an image printed on a transfer medium;

a control unit for adjusting the print density, said control unit being arranged to compare the first density and the second density, and to calculate a correction value to be applied to one of the first set value and the second set value for correcting the second density to the first density according to a density difference generation condition determined in advance, said control unit being arranged to correct the one of the first set value and the second set value according to the correction value for adjusting color balance;

a static latent image forming unit having a charging unit for charging an image supporting member and an exposure unit for forming a static latent image on the image supporting member;

an image forming unit having a developing unit for attaching developer to the static latent image to form a developer image; and a transfer unit for transferring the developer image to a transportation belt, said image forming unit being arranged to form density detection patterns with a low duty density, a middle duty density, and a high duty density on the image supporting member, said transfer unit being arranged to transfer the density detection patterns to the transportation belt so that the density detection patterns are printed on the transportation belt, said density detection unit being arranged to detect the second density from the density detection patterns, said control unit being arranged to change one of an energy amount of the static latent image forming unit and an energy amount of the developing unit according to the second density for correcting an amount of the developer and adjusting color balance in a first color balance adjustment.

12. The image forming apparatus according to claim 11, where said transfer unit is arranged to print the density detection patterns on the transportation belt after the first color balance adjustment, said density detection unit being arranged to detect a third density from the density detection patterns after the first color balance adjustment, said control unit being arranged to change the other of the energy amount of the static latent image forming unit and the energy amount of the developing unit according to the third density for correcting the amount of the developer and adjusting color balance in a second color balance adjustment.

13. The image forming apparatus according to claim 11, wherein said control unit is arranged to calculate the correction value of the energy amount of the developing unit using a weighing coefficient according to each of the low duty density, the middle duty density, and the high duty density when the control unit changes the energy amount of the developing unit.

14. The image forming apparatus according to claim 12, wherein said control unit is arranged to select the one of the energy amount of the static latent image forming unit and the energy amount of the developing unit according to the second density in the first color balance adjustment, said control unit being arranged to select the other of the energy amount of the static latent image forming unit and the energy amount of the developing unit according to the third density in the second color balance adjustment.

15. The image forming apparatus according to claim 14, wherein said control unit is arranged to select the one of the energy amount of the static latent image forming unit and the energy amount of the developing unit in the first color balance adjustment per color of the developer, and to select the other of the energy amount of the static latent image forming unit and the energy amount of the developing unit in the second color balance adjustment per color of the developer.

16. The image forming apparatus according to claim 14, wherein said control unit is arranged to select the one of the energy amount of the static latent image forming unit and the energy amount of the developing unit in the first color balance adjustment according to which one of the low duty density, the middle duty density, and the high duty density deviates from a target value most.

17. The image forming apparatus according to claim 16, wherein said control unit is arranged to select the energy amount of the static latent image forming unit in the first color balance adjustment when the middle duty density deviates from the target value most, said control unit being arranged to select the energy amount of the developing unit in the first color balance adjustment when the low duty density or the high duty density deviates from the target value most.

18. The image forming apparatus according to claim 16, wherein said control unit is arranged to calculate the correction value of the energy amount of the static latent image forming unit in the first color balance adjustment when the middle duty density deviates from the target value most, said control unit being arranged to determine whether the correction value is within an allowable range, said control unit being arranged to select the energy amount of the static latent image forming unit and change the energy amount of the static latent image forming unit using the correction value when the control unit determines that the correction value is within an allowable range, said control unit being arranged to select the energy amount of the developing unit when the control unit determines that the correction value is not within an allowable range.

19. The image forming apparatus according to claim 18, wherein said control unit being arranged to change the energy amount of the static latent image forming unit using a value smaller than the correction value when the control unit selects the energy amount of the static latent image forming unit in the second color balance adjustment.

20. The image forming apparatus according to claim 11, wherein said control unit is arranged to change one of a developing voltage, a supply voltage, and a charging voltage as the energy amount of the developing unit.

* * * * *